US007236751B2

(12) United States Patent
Ono

(10) Patent No.: US 7,236,751 B2
(45) Date of Patent: Jun. 26, 2007

(54) STRAP PENDANT WITH INPUT BUTTONS ON STRAP FOR CONTROLLING ATTACHED PORTABLE DEVICES

(75) Inventor: Shuzo Ono, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 42 days.

(21) Appl. No.: 10/918,900

(22) Filed: Aug. 16, 2004

(65) Prior Publication Data
US 2005/0052852 A1 Mar. 10, 2005

(30) Foreign Application Priority Data
Aug. 18, 2003 (JP) ............................. 2003-294282
Aug. 20, 2003 (JP) ............................. 2003-296607

(51) Int. Cl.
*H04B 1/38* (2006.01)
(52) U.S. Cl. .................. 455/90.3; 455/575.2; 455/572; 455/557; 381/385
(58) Field of Classification Search ............ 455/575.1, 455/90.3, 557, 572, 567, 575.2
See application file for complete search history.

(56) References Cited

U.S. PATENT DOCUMENTS

| 5,757,929 A * | 5/1998 | Wang et al. ................. 381/300 |
| 6,181,237 B1 * | 1/2001 | Gehlot ..................... 340/407.1 |
| 6,594,370 B1 * | 7/2003 | Anderson .................... 381/315 |
| 2002/0065115 A1 * | 5/2002 | Lindholm ................... 455/568 |
| 2002/0090099 A1 * | 7/2002 | Hwang ....................... 381/312 |
| 2005/0219843 A1 * | 10/2005 | Arell et al. ................. 362/253 |

FOREIGN PATENT DOCUMENTS

JP 2001-258078 9/2001

* cited by examiner

*Primary Examiner*—William Trost
*Assistant Examiner*—Dung Lam
(74) *Attorney, Agent, or Firm*—Brinks Hofer Gilson & Lione

(57) ABSTRACT

An input/output device is adopted which includes a pendant strap and a connecting member connecting the strap in a ring shape. The strap incorporates at least one input portion. The connecting member includes a connector for the input portion and a portable information device. The input portion has a plurality of input modes and may be movable along the front or back of the strap body.

10 Claims, 14 Drawing Sheets

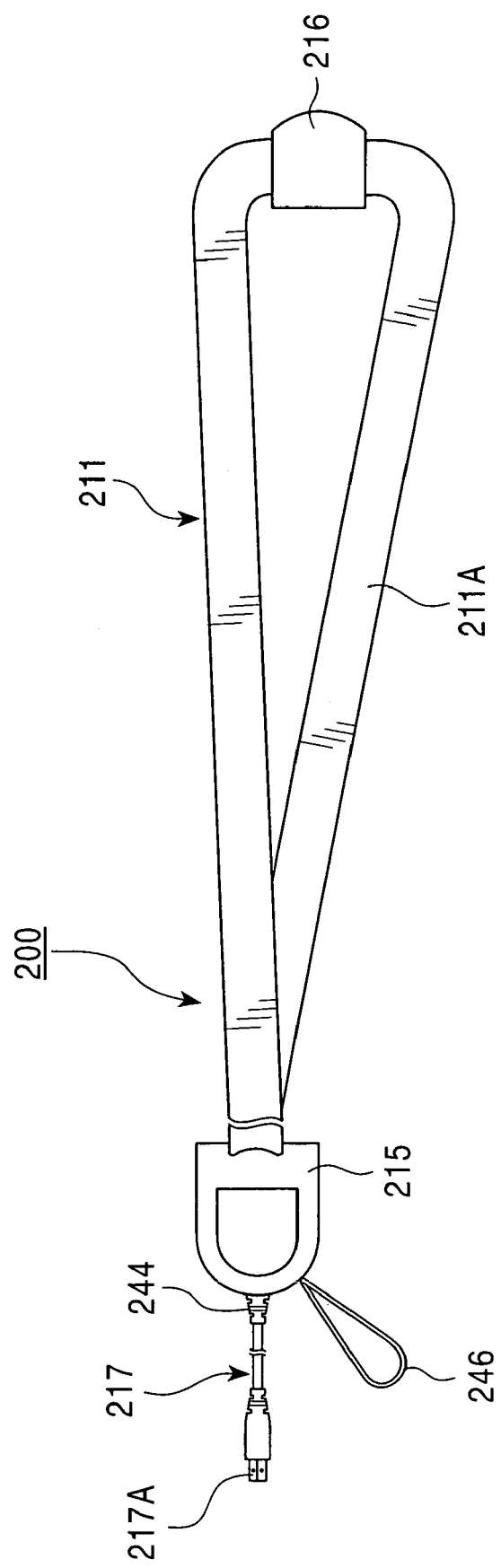

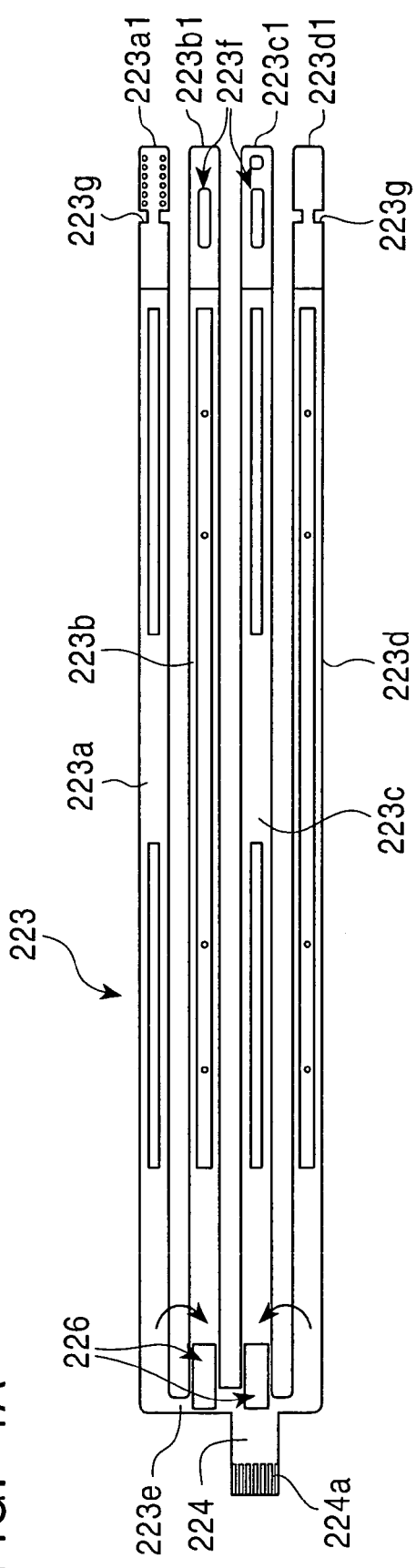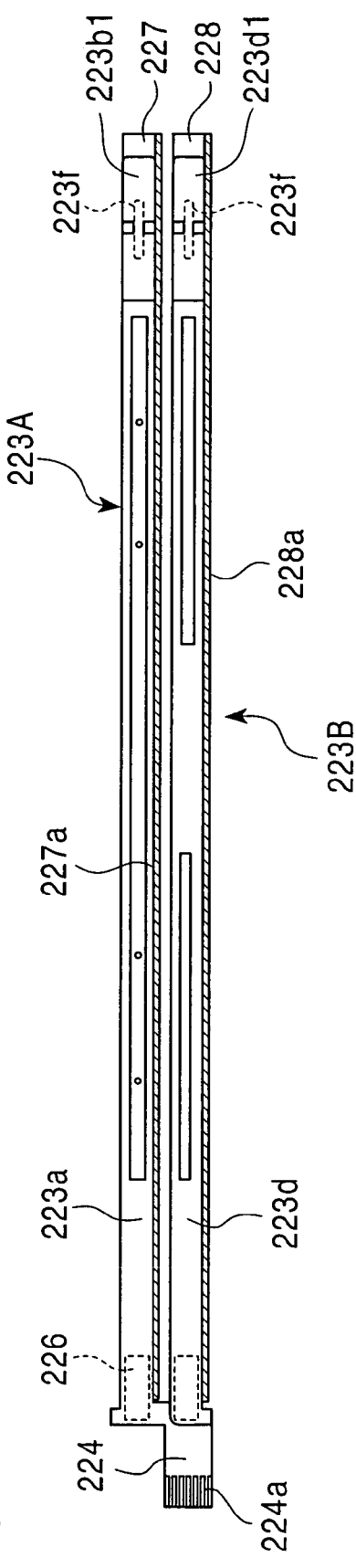
FIG. 4A
FIG. 4B

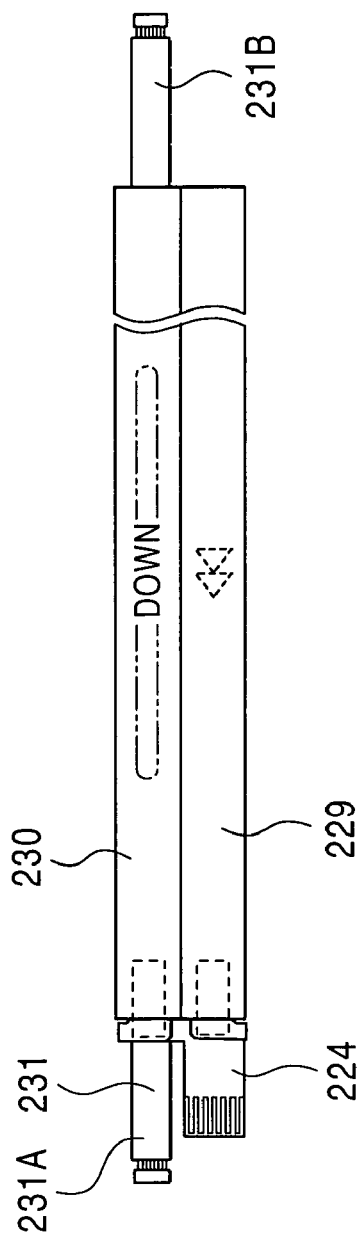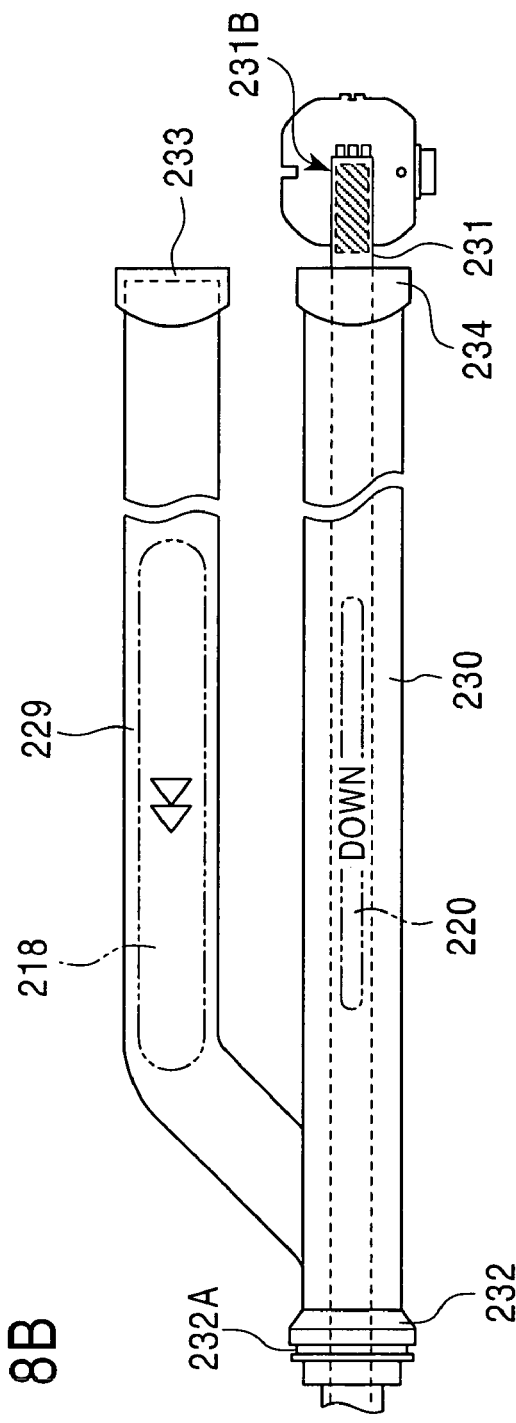

STRAP PENDANT WITH INPUT BUTTONS ON STRAP FOR CONTROLLING ATTACHED PORTABLE DEVICES

This application claims the benefit of priority to Japanese Patent Application Nos. 2003-294282 filed on Aug. 18, 2003 and 2003-296607 filed on Aug. 20, 2003, herein incorporated by reference.

BACKGROUND OF THE INVENTION

1. Field of the Invention

The present invention relates to an input/output device for operating electronic equipment and inputting information via electric signals.

2. Description of the Related Art

FIG. 15 shows an example of a portable audio unit including a conventional remote controller (input/output device). A portable audio unit 1231 shown in this drawing has a disc-shaped operating portion 1232 for switching operation by crosswise seesaw motion, with which, for example, the playback/stop, skip, and back skip (reverse) of a sound disc can be performed.

A remote controller R2 of the portable audio unit 1231 includes an operating portion S2 for operating the portable audio unit 1231, a coated wire 1235 for an audio signal connected to a case 1233 having the operating portion S2, a pair of earphones 1236 connected to the end of the coated wire 1235, and a cord coated wire 1238 attached to the case 1233 and having a plug 1237 at one end. The coated wire 1238 is an integration of a coated wire for drawing an audio signal and a coated wire (not shown) for drawing a signal from the operating portion S2.

The operating portion S2 includes a box-shaped case 1233 made of synthetic resin molding and an operating portion 1234 exposed from the case 1233, with which switching operation is performed by crosswise seesaw motion, as with the operating portion 1232. The operating portion 1234 allows the same operation as that of the operating portion 1232 provided to the casing of the portable audio unit 1231.

The remote controller R2 can be attached and detached to/from the portable audio unit 1231 by inserting or drawing the plug 1237 into/from the jack of the portable audio unit 1231. The portable audio unit 1231 is generally used such that the earphones 1236 are inserted into ears with the portable audio unit 1231 in a pocket of clothing or in a bag. Playback/stop operation etc. can be performed with the operating portion S2 of the remote controller R2.

The applicant proposes a remote controller including an operating member provided at a cord-like pliable external member as one applicable to a portable audio unit. (For example, Japanese Unexamined Patent Application Publication No. 2001-258078.

Remote controllers mounted not only to portable audio units but cellular phones and portable information devices have recently been made compact. However, the remote controller R2 with the structure shown in FIG. 15 is reduced in size, also the operating portion S2 will inevitably become compact, decreasing the width and stroke of the seesawing operating portion 1234 to produce the problem of reducing operation efficiency. Some of the operating portion S2 has multiple button switches in place of the operating portion 1234, in which case reducing the size of the operating portion will significantly reduce operation efficiency. Furthermore, reducing the size of the operating portion inevitably requires correct finger operation. However, when it is dark in the surroundings, it is difficult to select a specified one from the button switches arranged in a concentrated manner and it is also sometimes difficult to see which button is pushed by viewing a display etc.

SUMMARY OF THE INVENTION

The present invention has been made to solve the above-described problems. Accordingly, it is an object of the present invention to provide an input/output device which achieves high operation efficiency and miniaturization and which allows confirmation of the operation.

In order to achieve the above object, the present invention adopts the following structure.

An input/output device according to the invention includes a pendant strap and a connecting member connecting the strap in a ring shape. The strap incorporates at least one input portion. The connecting member includes a connector for the input portion and a cellular phone or a portable information device.

The input/output device with such a structure includes a pendant belt-like strap having an input/output portion applicable as the operating means for cellular phones or portable information devices. The input/output device with such a structure has high operation efficiency and can be made compact. Also the appearance of the input/output device can easily be improved.

The "portable information devices" in this invention include what is called personal digital assistants (PDAs) and notebook computers.

With such a structure, a compact and lightweight input/output device can be provided, thus reducing inconvenience when being carried or during operation. Accordingly, an input/output device suitable for cellular phones and portable information devices can be provided.

In the input/output device according to the invention, preferably the strap incorporates a power source and the connector includes a power terminal, wherein the power source and the cellular phone are connected together with the power terminal.

With such a structure, a cellular phone can be charged with the power source provided to the input/output device. Even if a cellular phone runs down unexpectedly, it can be supplied with power.

In the input/output device according to the invention, the connector is preferably a USB connector.

With such a structure, providing the USB connector allows the input/output device to be used as the operating means for a portable information device. Also, the input portion of the input/output device can be supplied with power via the USB connector from the portable information device.

In the input/output device according to the invention, preferably, the strap further includes first and second case-type connecting members at one end and the other end and a wiring member connected to the connector therein. The first case-type connecting member includes an input/output circuit connecting the input portion and the connector together therein. The second case-type connecting member includes a terminal connected to the wiring member and capable of input and output for the cellular phone or the portable information device.

The output of electronic equipment can be used by using the terminal in the connecting member. Since the terminal is disposed at a case-type connecting member fixed to the end of the strap, equipment such as earphones and a headphone can easily be connected, allowing a user to listen to audio information from the cellular phone or the portable information device connected to the connecting means.

In the input/output device according to the invention, preferably, the strap or the connecting member incorporates a vibrating member vibrating in accordance with an incoming signal of the cellular phone or a signal of the portable information device.

Since the connecting member includes the vibrating member, the vibrating member can be disposed inconspicuously and the vibration can easily be sensed with the pendant strap, allowing a user to sense input/output operation in accordance with the switch input/output operation.

Since the vibrating member vibrates in accordance with incoming signals etc., the operating state can easily be grasped from the vibration depending on the operating state of the input portion.

Furthermore, even when a user cannot catch an incoming call owing to environmental noises or disability or keeps a cellular phone in a bag in vibrating mode, the user can perceive an incoming call as vibration felt by the body or perceive that a portable information device has been surely operated as vibration felt by the body.

In the input/output device according the invention, preferably, the connecting member includes a control circuit therein. When a plurality of the cellular phones or the portable information devices is connected, the control circuit selects one of the connected cellular phones and portable information devices and connects it to the input portion.

With such a structure, when a user carries multiple cellular phones or portable information devices or both of cellular phone and portable information device at the same time, the user does not need to carry multiple input/output devices but can connect the cellular phones etc. with one of the input/output devices and then select one, thus improving operation efficiency.

The vibrating member preferably includes any of a vibrating motor, a coil vibrator, and a piezoelectric vibrating element as vibration source.

The vibrating motor, the coil vibrator, and the piezoelectric vibrating element are compact or thin, consume relatively low power, and can generate vibration sufficient for a user to perceive. In this case, the vibrating motor has an eccentric weight around the rotating shaft of the motor. The coil vibrator is of a buzzer type including an electromagnetic coil, a vibrating piece, and a switching circuit. The piezoelectric vibrating element is made of an element that is deformed and recovered by pulsed charging.

The vibrating member is preferably disposed in a position where vibration can be transmitted to the user of the strap. Particularly, it is preferable to mount the vibrating member in a position where vibration can be transmitted to the back of the user's neck.

The position where vibration can be transmitted to the user is, for pendant straps such as the input/output device of the invention, a position that comes in contact with the back of the user's neck when it is hung around the neck with the connecting member on this hand, briefly, the center of the ring-shaped strap or the inside in the vicinity thereof. When the input/output device is a hand-held strap, to the connecting member of which external electronic equipment is connected, it is preferable to dispose the vibrating member in the center of the ring-shaped strap or the inside in the vicinity thereof. When the input/output device of the invention is of a list-band type, it is preferable to dispose the vibrating member in a suitable position on the back of the band in contact with an arm.

In the input/output device according to the invention, the connecting member or the strap preferably has a power source for supplying power at least to the vibrating member.

Specific power is used to drive the vibrating member. Since the power does not always depend on the power source of connected external electronic equipment, it is preferable that the power source for driving at least the vibrating member be mounted to the input/output device of the invention. The mounted power source may supply power not only to drive the vibrating member but also to operate the remote controller.

A remote controller according to the invention includes a strap body incorporating input means and having pliability and a connecting member for connecting the strap body and portable electronic equipment. The input means has a plurality of input modes. With such a structure, multiple input modes can be allocated depending on portable electronic units, so that general-purpose versatility can easily be provided.

The remote controller according to the invention, the input means is preferably disposed so as to be movable at least along the length of the strap body. With such a structure, input operating position can be varied depending on the preference of a user.

In the remote controller according to the invention, the input means preferably includes a plurality of contacts arranged along the length of the strap body. With such a structure, multiple input modes can be provided easily and surely by setting the position and/or number of contacts to be used depending on portable electronic units. The position of input means, or input operating position, can be located in a desired position of a user depending on the setting of the contacts to be used.

In the remote controller according to the invention, preferably, the input means can be operated indirectly by an operating member covering part of the strap body, and the operating member is disposed to be movable at least along the length of the strap body and has operation marks on the surface. With such a structure, the operating member can prevent contamination of the input means and can be cleaned or replaced by being detached from the strap body. The marks facilitate input operation to the input means.

In the remote controller according to the invention, the input means is preferably provided on the front and back of the strap body. With such a structure, input modes can easily be switched.

The remote controller according to the present invention offers great advantages of having general-purpose versatility that they can be used for various portable electronic units.

BRIEF DESCRIPTION OF THE DRAWINGS

FIG. 3 is a bottom view the strap controller;

FIG. 4A is an expansion plan of a membrane incorporated in the strap controller;

FIG. 4B is a diagram showing a folded state of the membrane;

FIG. 8A is a plan view of part of the membrane covered with the package and the external package;

FIG. 8B is a plan view of the other part of the membrane;

DESCRIPTION OF THE PREFERRED EMBODIMENTS

Embodiments of the present invention will be specifically described with reference to the drawings.

(First Embodiment)

Figure 1:
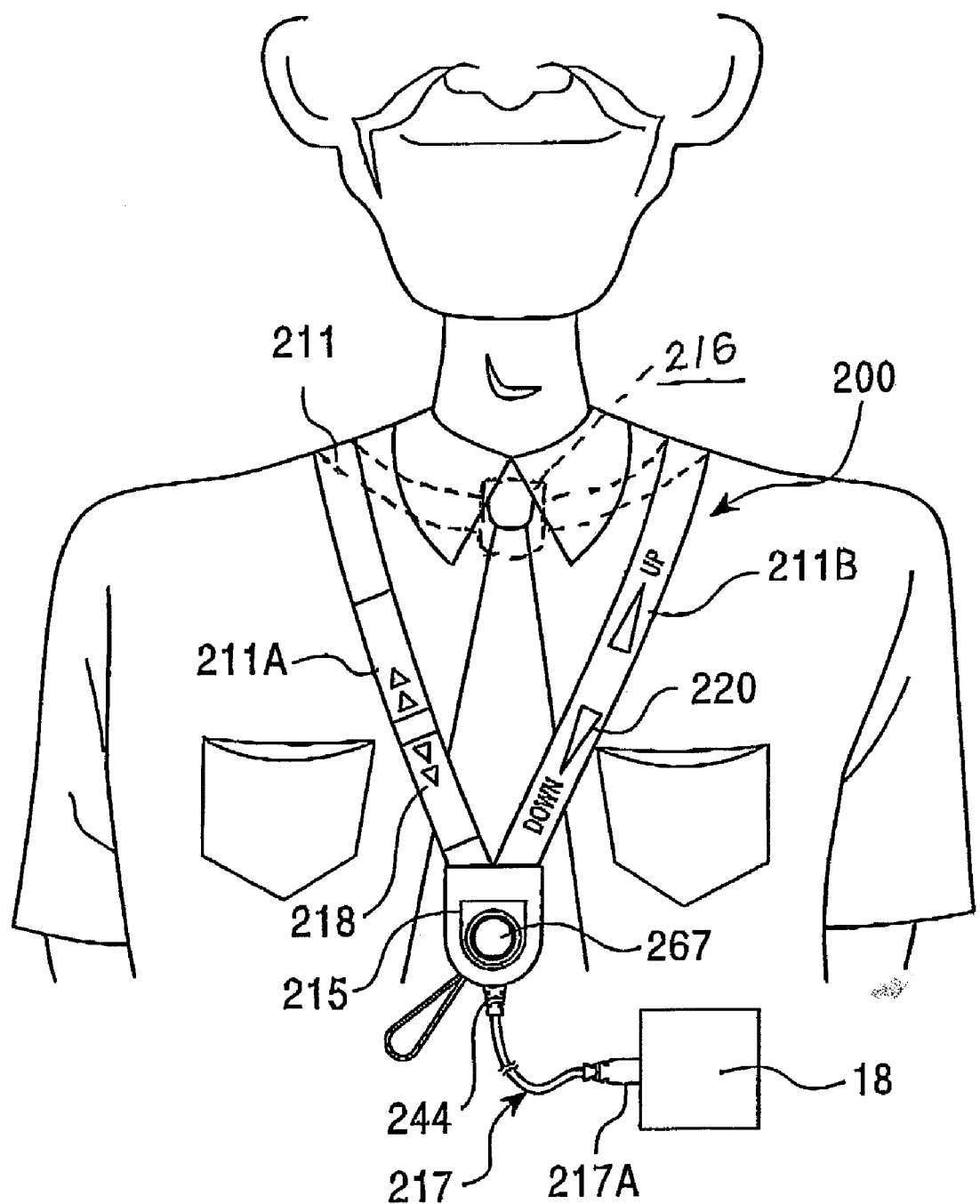
FIG. 1 is a diagram of a pendant strap controller according to a first embodiment of the present invention.
Figure 2A:
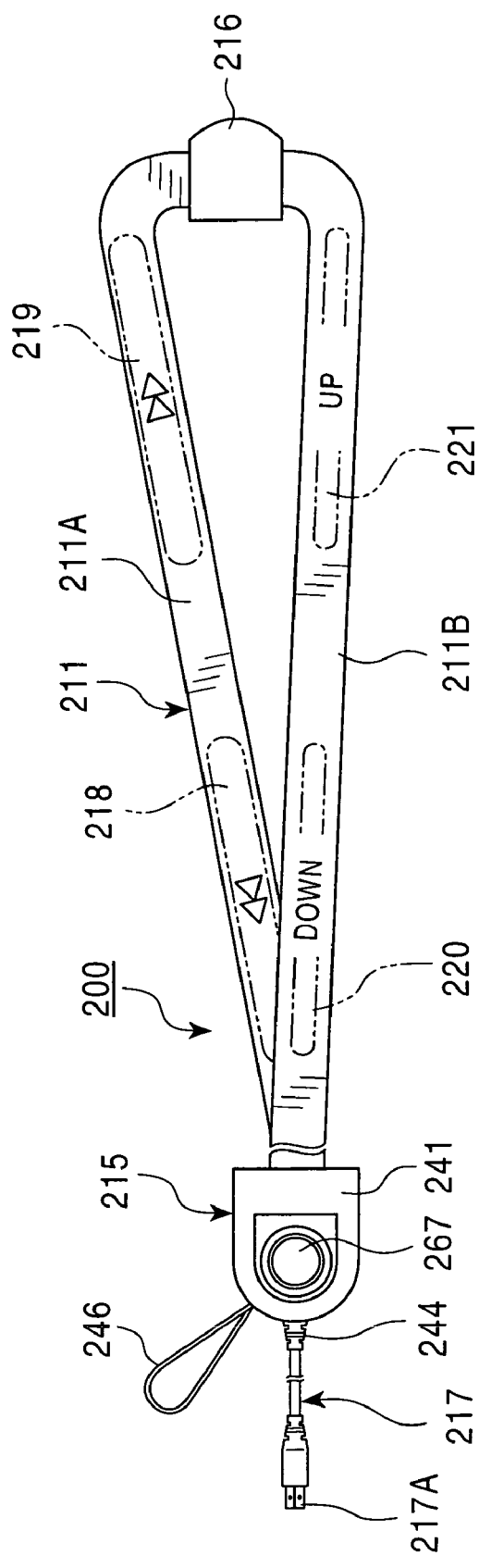
FIG. 2A is a plan view of the entire structure of the strap controller.
Figure 2B:
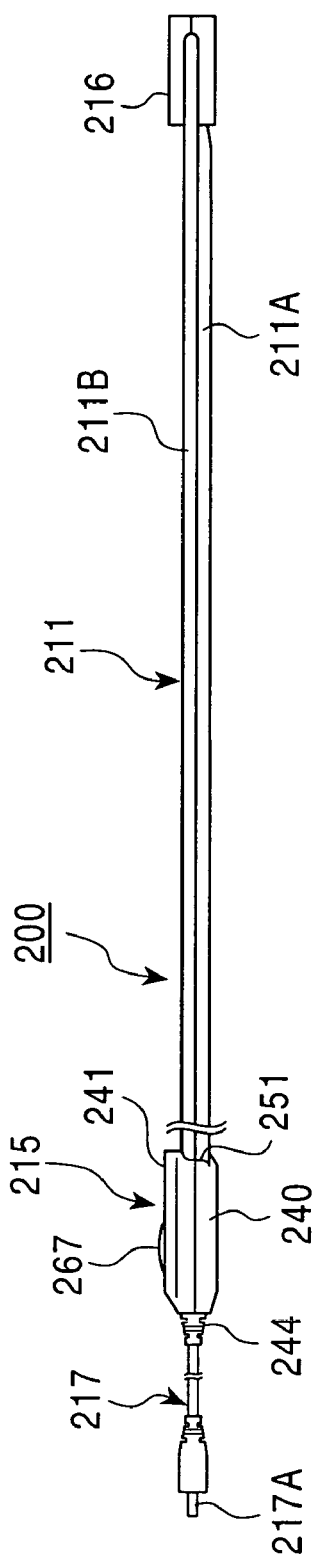
FIG. 2B is a side view of the entire structure of the strap controller.

FIGS. 1 to 11 show a strap controller 200 according to a first embodiment of the present invention. The strap controller 200 of this embodiment includes a flat-string (belt-like) pendant strap 211 crossed substantially in a V-shape, as shown in FIGS. 1 and 2, a first connecting member 215 which connects the strap 211 into a ring shape and including a universal serial bus (USB) connector (joint), and a second connecting member 216. The first connecting member 215 connects to a connecting cord 217 for connecting a USB connector (not shown) and a portable information device (for example, a personal digital assistant (PDA) including the functions of scheduling management, address management, etc.) 18. In this embodiment, a USB terminal 217A for connection to the portable information device 18 shown in FIG. 1, for example, is provided at the end of the connecting cord 217.

In the strap controller 200 of the first embodiment, the strap 211 is composed of two strap bodies 211A and 211B crossed in a ring shape, with the first connecting member 215 at one end and the second connecting member 216 at the other end. The strap body 211A has a set of switches (input portions) 218 and 219 incorporated thereto, while the other strap body 211B has sliding switches (input portions) 220 and 221 incorporated therein.

The strap bodies 211A and 211B have a pliable sheet-like membrane 223 made of a polyethylene terephthalate (PET) film etc. accommodated therein in a folded condition, as will be described below. Referring to FIG. 4A, the membrane 223 is formed in a comb shape in which first to fourth strip substrates 223a, 223b, 223c, and 223d are disposed in parallel apart from one another, the ends of which are connected with a crosspiece 223e on one side. A tongue-shaped terminal 224 projects from the center of the side of the crosspiece 223e opposite to the third substrate 223c. The terminal 224 has a plurality of circuit patterns 224a for connecting to the contact of an input portion, to be described later, to route en electric circuit.

Figure 5:
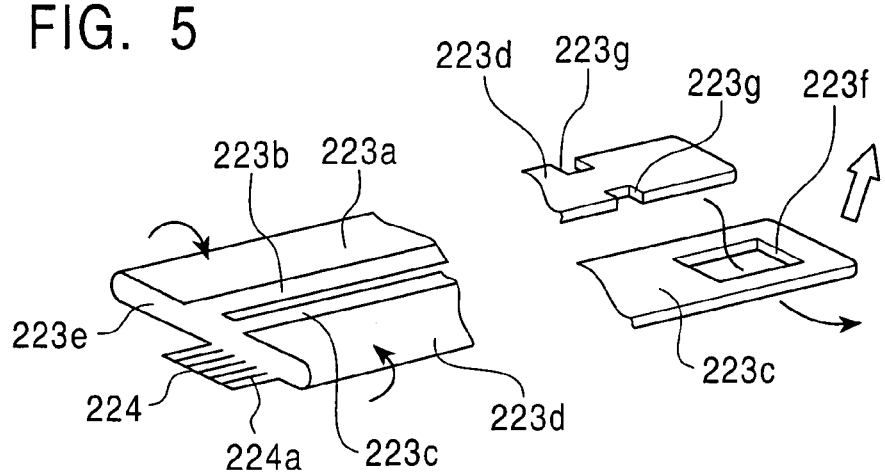
FIG. 5 is a perspective view of the membrane for explaining the layered structure of the end of the membrane.

As shown in FIGS. 4B and 5, the membrane 223 with such a structure is processed into a forked shape as a whole in such a manner that part of the crosspiece 223e at the base of the first substrate 223a is folded so that the first substrate 223a lies over the second substrate 223b to form a layered body 223A and part of the crosspiece 223e at the base of the fourth substrate 223d is folded so that the fourth substrate 223d lies over the third substrate 223c to form a layered body 223B. The base of the first substrate 223a is bonded to the base of the second substrate 223b and the base of the fourth substrate 223d is bonded to the base of the third substrate 223c with bonding layers 226 provided on the surface in the vicinity of the folded crosspiece 223e.

Rectangular slits 223f are provided at the distal ends of the second substrate 223b and the third substrate 223c. The slits 223f pass through the second substrate 223b and the third substrate 223c along the thickness. Notches 223g are provided at opposite rims of the distal ends of the first substrate 223a and the fourth substrate 223d for adjusting the width of the substrates 223a to 223d to a width that allows them to pass through the slits 223f. The distal end 223a1 of the first substrate 223a is drawn out to the back of the second substrate 223b through the slit 223f of the second substrate 223b and laid on the second substrate 223b. The distal end 223d1 of the fourth substrate 223d is drawn out to the back of the third substrate 223c through the slit 223f of the third substrate 223c and laid on the third substrate 223c.

The notch 223g of the first substrate 223a is located at the inner rim of the slit 223f of the second substrate 223b with the substrates 223a and 223b placed one on top of the other, while the notch 223g of the fourth substrate 223d is located at the inner rim of the slit 223f of the third substrate 223c with the substrates 223c and 223d placed one on top of the other, and the distal end of the first substrate 223a and the distal end of the second substrate 223b are placed one on top of the other such that they can slide relatively (freely slip off) a specified distance along the length, while the distal end of the third substrate 223c and the distal end of the fourth substrate 223d are placed one on top of the other such that they can slide relatively (freely slip off) a specified distance along the length.

In other words, the distal end 223a1 of the first substrate 223a and the distal end 223b1 of the second substrate 223b are placed in layers so as to slide relatively within the range to move the notches 223g along the slit 223f, while the distal end 223c1 of the third substrate 223c and the distal end 223d1 of the fourth substrate 223d are placed in layers so as to slide relatively within the range to move the notches 223g along the slit 223f.

Figure 6:
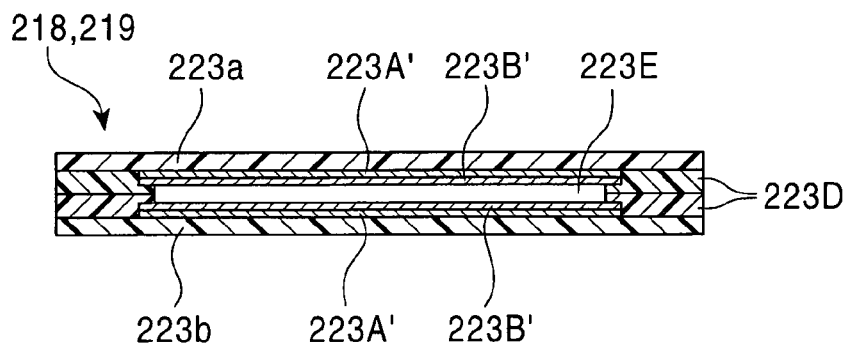
FIG. 6 is a cross-sectional view of the membrane.

On the other hand, as shown in FIG. 6 for example, an electrode layer 223A' made of a good conductor film connecting to the circuit patterns 224a of the terminal 224 is provided along the surfaces of the first substrate 223a to the fourth substrate 223d, on which resistive layers 223B' made of a resistive film are provided. The periphery of the resistive layers 223B' is coated with an insulating resist film 223D, with a specified range exposed. The exposed part serves as a contact 223E. The substrates 223a to 223d each have a contact having the same flat shape on the surfaces.

Since the first substrate 223a and the second substrate 223b are placed one on top of the other, the resistive layers 223B' of the substrates are opposed a specified distance apart, as shown in FIG. 6, thereby forming the switches (input portions) 218, 219, 220, and 221. The contacts are used by deflecting opposing resistive layers to bring them into contact with each other.

The terminals of the circuit patterns 224a of the membrane 223 are connected to any of the electrode layers formed on the surfaces of the first substrate 223a to the fourth substrate 223d, to transmit input from the contacts to the terminals of the circuit patterns 224a.

When voltage is applied to the opposite ends of the resistive layers of the switches 218 to 221 to form electric fields along the length of the resistive layers, positional information in the longitudinal direction of the contacts can be acquired from potentials taken from the electrode layers at contact positions. Also the direction and speed of fingers that slide on the substrate can be determined by continuously acquiring positional information. If a device connected to the USB terminal 217A is the portable information device 18, described above with reference to FIG. 1, for example, menu items can be selected and a slider switch etc. can be operated on its operation screen in accordance with the acquired positional information and moving direction. In this embodiment, other functions such as the ON/OFF of the power supply of the portable information device 18 and switching of applications can be of course allocated according to the position of the contacts.

The switches 218 to 221 applied in this embodiment are not limited to the structure including the resistive layers and the electrode layers of the shape shown in FIGS. 4 to 7, but may be other layered switch structures.

Although the switch 218 of this embodiment is given the function of a skip operation, the switch 219 a back switch operation, and the switches 220 and 221 a sliding operation, it is obvious that the invention is not limited to those functions.

Figure 7:
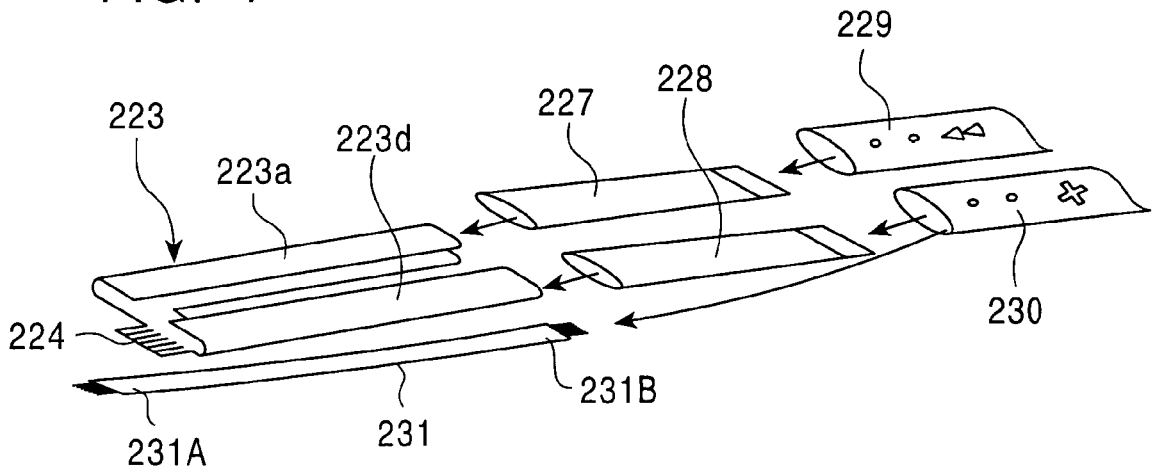
FIG. 7 is a perspective view of the membrane for explaining the way of inserting the membrane into a package and an external package.

Referring to FIG. 7, the part of the forked membrane 223 where the first substrate 223a and the second substrate 223b are lapped one on top of the other is inserted into a long waterproof bag-shaped package 227 made of polyethylene etc., and the part where the third substrate 223c and the fourth substrate 223d are lapped one on top of the other is inserted into a long waterproof bag-shaped package 228 made of polyethylene etc., which are then inserted into external packages 229 and 230, respectively. Furthermore, a pliable wiring substrate (wiring member) 231 is passed through the external package 230, through which the third substrate 223c and the fourth substrate 223d are passed, so as to pass outside the package 228. The packages 227 and 228 are shaped like a bag one end of which is closed and the other end is opened and which has a length to cover the entire length of the strip substrate of the membrane 223.

Accordingly, the first substrate 223a and the second substrate 223b, and the package 227 and the external package 229 which cover the substrates 223a and 223b construct one strap body 211A. The third substrate 223c and the fourth substrate 223d, the package 228 which covers the substrates 223c and 223d, the pliable wiring substrate 231, and the external package 230 construct the other strap body 211B.

The rim (indicated by the slant lines in FIG. 4B) of the package 227 at one side rim of the first substrate 223a and the second substrate 223b which are lapped one on top of the other is welded to wrap the substrates 223a and 223b tightly, and the rim (indicated by the slant lines in FIG. 4B) of the package 228 at one side rim of the third substrate 223c and the fourth substrate 223d which are lapped one on top of the other is welded to wrap the substrates 223c and 223d tightly.

Referring to FIG. 8A, the terminal 224 of the membrane 223 and a first end 231A of the pliable wiring substrate 231 are drawn out from the respective first ends of the external packages 229 and 230 by a desired length. The external packages 229 and 230 on this end are placed one on the top of the other, on the surface of which a covering member (molding) 232 made of resin molding is provided to connect the external packages 229 and 230 together and on the surface of the other ends of which plate-like covering members 233 and 234 made of resin molding are provided, respectively. A second end 231B of the pliable wiring substrate 231 is also drawn out from a second end of the strap body 230 by a desired length.

The first ends of the external packages 229 and 230 having the covering body 232 connect to the above-described first connecting member 215. The first connecting member 215 is of a racetrack type in plan view, and has a hollow structure including a thin bottom case 240 open at the top and a thin upper case 241 open at the lower surface.

Figure 9:
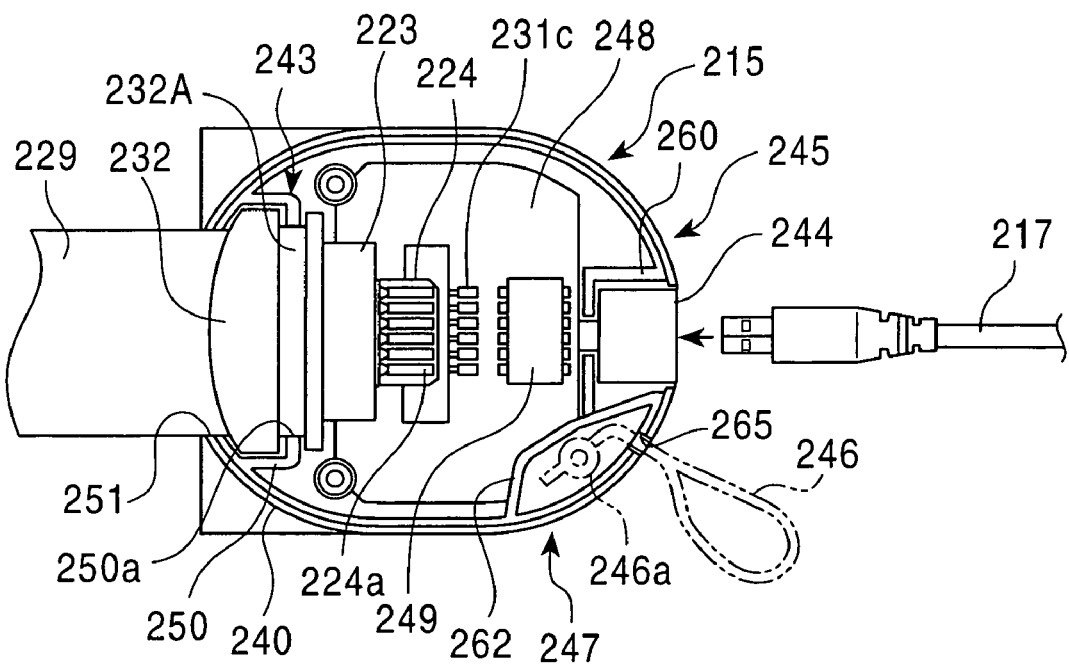
FIG. 9 is a partial exploded explanatory view of a strap body connected to a bottom casing of a connecting member.

Referring to FIG. 9, the bottom case 240 includes a first enclosure (double-wall structure) 243 which can partially accommodate the end of the external package 229 and the covering member 232, at one end therein, a second enclosure (double-wall structure) 245 which can partially accommodate a USB connector 244, at the other end, a third enclosure (double-wall structure) 247, which can accommodate the base end 246a of a pendant loop strip 246, adjacent to the enclosure 245, a mounting substrate 248 for connecting wires, an IC chip 249, a switch (not shown), etc.

The first enclosure 243 has an insertion opening 251 for drawing the end of the external package 229 at part of the outer wall of the bottom case 240, and has an inner wall 250 for surrounding about half of the thickness of the covering member 232 drawn into the first connecting member 215 through the insertion opening 251. The inner wall 250 has a recess 250a at the inner surface for engagement with a circumferential groove 232A of the covering member 232. The membrane 223 of the external package 229 is drawn across the recess 250a so that the circuit patterns 224a of the terminal 224 of the membrane 223 are electrically connected to the IC chip 249 on the substrate 248. The wire end 231c of the pliable wiring substrate 231 drawn out from the end of the external package 229 is electrically connected to the IC chip 249.

The second enclosure 245 has a double-wall structure in which an inner wall 260 of a size that can surround the USB connector 244 is provided inside the peripheral wall of the bottom case 240. The USB connector 244 is connected through part of the peripheral wall of the bottom case 240 and part of the inner wall 260 inside thereof. The third enclosure 247 has an inner wall 262 which forms a space that can accommodate the base end 246a of the strip 246 which serves as a knot, inside the peripheral wall of the bottom case 240. The strip 246 is passed through a through hole 265 formed in part of the outer wall of the bottom case 240. The first to third enclosures 243, 245, and 247 are provided to increase the water resistance of the first joint member 215.

Figure 10:
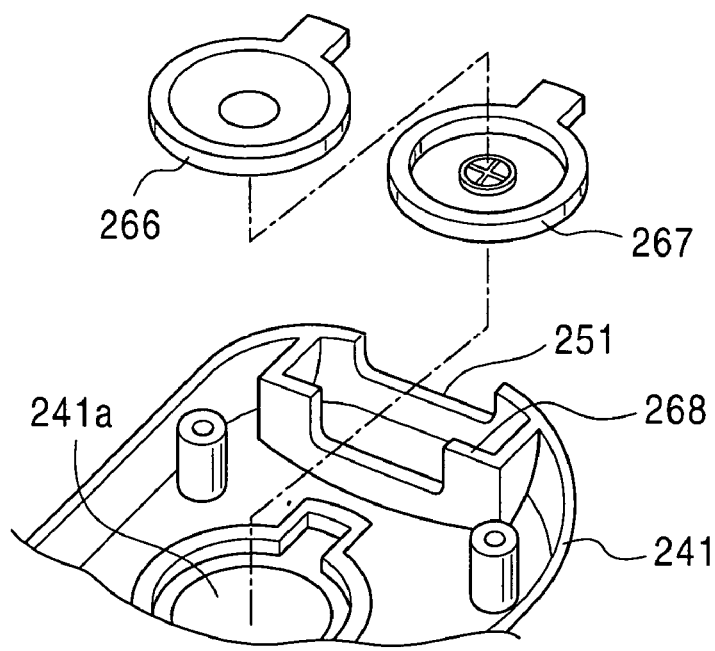
FIG. 10 is an exploded perspective view of a cover to be put on the bottom casing shown in FIG. 9.

An upper case 241, shown in FIG. 10, of a size that can close the bottom case 240 is integrated onto the bottom case 240 of the first connecting member 215 with connecting means such as a screw. A through hole 241a is provided in the center of the upper case 241. The through hole 241*a* has a disc-shaped sealing member 266 made of waterproof rubber and a disc-shaped key-top member 267 such that they are mounted from the inside. The key-top member 267 serves as a push button for operating a switch (not shown in FIGS. 9 and 10). An inner wall 268 having the same function as the first enclosure 243 of the bottom case 240 is provided on the inner peripheral wall of the upper case 241. The inner wall 268 is constructed so as to construct the first enclosure 243 together with the inner wall 250 which surrounds about half of the covering member 232 to surround the covering member 232 when the upper case 241 is placed over the bottom case 240 into one piece.

The other side of the upper case 241 has a double-wall structure having an inner wall that surrounds the USB connector 244 together with the inner wall 260 of the second enclosure 245 of the bottom case 240. The upper case 241 also has an inner wall that surrounds the base end 246*a* of the strip 246 to form a double-wall structure together with the inner wall of the third enclosure 247 of the bottom case 240. The illustration of the double-wall structure of the upper case 241 is omitted in FIG. 10.

Accordingly, the end of the external package 229, the covering member 232, the USB connector 244, and the strip 246 are connected to the first connecting member 215, with the water resistance increased by the bottom case 240 and the first to third enclosures 243, 245, and 247 of the upper case 241.

Figure 11:
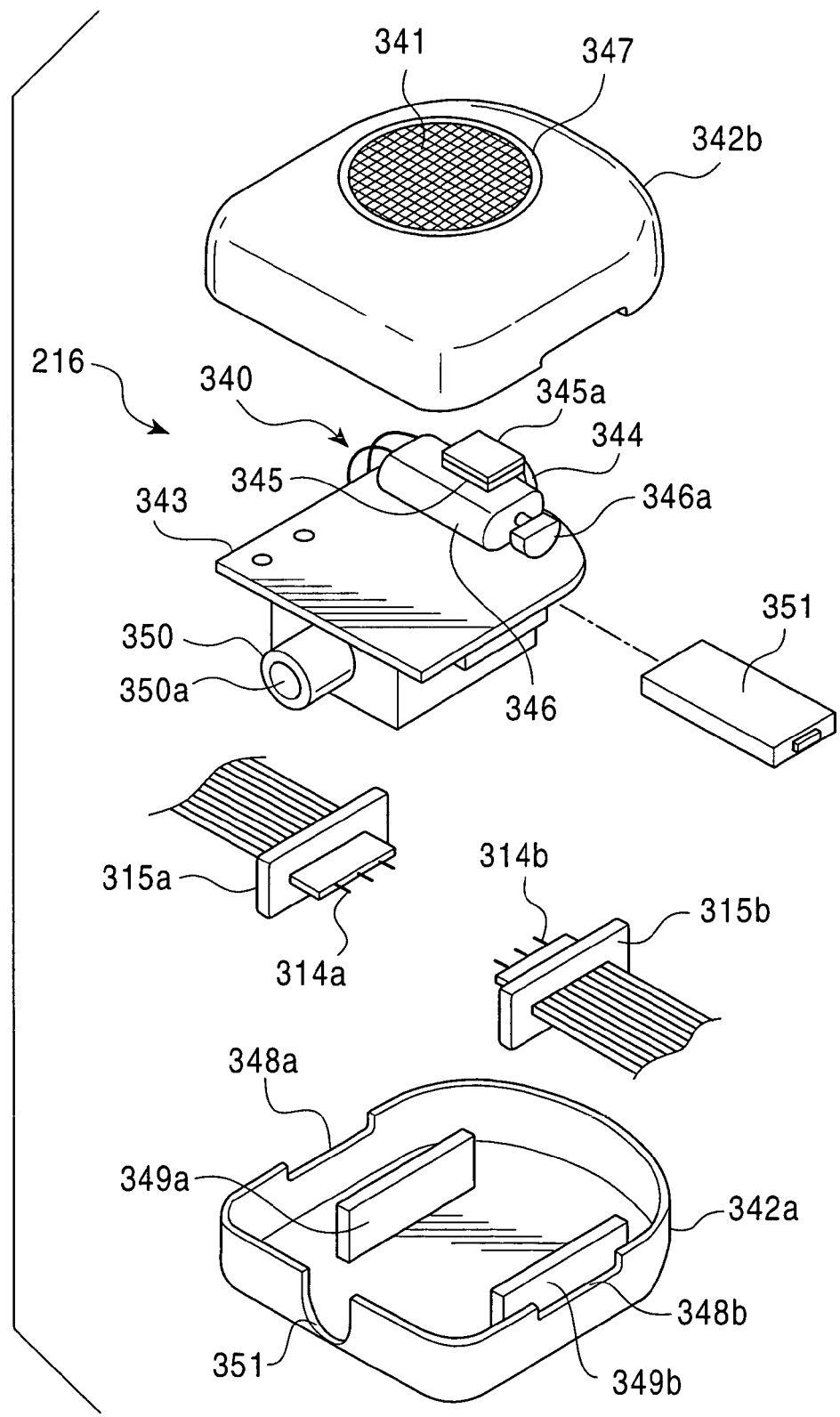
FIG. 11 is an exploded perspective view of the other connecting member provided to the strap controller.

FIG. 11 is an exploded perspective view of a vibrating member 340 and the other components accommodated in the second connecting member 216. In this embodiment, the mechanism of the vibrating member 340 and an earphone jack socket 350 are combined and accommodated in a casing 342*a*. The vibrating member 340 schematically includes a vibrating plate 341, a casing 342*a*, a cover 342*b*, a hard substrate 343, a spring member 344, a seating 345, a vibrating motor 346, the earphone jack socket 350, and a battery (power source) 351.

The vibrating plate 341 is located in a position that comes into contact with the back of a user's neck when the user wears the device around the neck, and has a surface pattern that allows the user to perceive the vertical vibration without uncomfortable feeling. The vibrating plate 341 is disposed so as to project slightly to be exposed from an opening 347 formed in the cover 342*b*.

The vibrating motor 346 has an eccentric weight 346*a* mounted to the rotation shaft of the motor and generates vibration by rotating the eccentric weight 346*a* when an instruction to generate vibration is given from a control circuit (not shown) in a state in which power is supplied from the battery 351. The vibrating motor 346 is fixed to one side of the seating 345. A rubber cushion 345*a* is adhered to the other side of the seating 345. The back of the vibrating plate 341 is adhered to the surface of the rubber cushion 345*a*.

The seating 345 is supported by the belt-shaped spring member 344 bent upward from the hard substrate 343. When the vibrating motor 346 rotates, the spring member 344 converts the rotating vibration into a vertical stroke vibration and has a repelling force to recover immediately even if the vibrating plate 341 is pushed down by an external force unexpectedly.

The hard substrate 343 includes a driving circuit, a connecting terminal, etc. on the surface (the lower surface in the drawing) opposite to the vibrating motor 346, and further includes the earphone jack socket 350 and the battery 351 directly mounted thereto. The earphone jack socket 350 has a jack insertion hole 350*a* open to the exterior of the second connecting member 216 through an opening 351 provided in the casing 342*a*.

The strap bodies 211A and 211B have signal and power-supply wires passed therethrough. The terminals of the wires are introduced into the casing 342*a* of the vibrating member 340 and connected to prescribed connecting terminals of the substrate 343. The terminals of the strap bodies 211A and 211B for the vibrating member 340 have flanges 315*a* and 315*b*. The flanges 315*a* and 315*b* are fitted into notches 348*a* and 348*b*, respectively, formed at the rim of the casing 342*a*, so that the strap bodies 211A and 211B are joined together tightly and flexibly. The casing 342*a* has stoppers 349*a* and 349*b* on the inner wall to prevent the flanges 315*a* and 315*b* from being pushed to damage the circuit etc. The casing 342*a* comes into engagement with the cover 342*b* with the aforesaid components accommodated therein, forming the outer shell of the vibrating member 340.

The strap controller 200 constructed as has been described is used in such a way that the strap bodies 211A and 211B joined in a ring shape, with the first connecting member 215 placed on the breast, the second connecting member 216 on the back of the neck, and the USB terminal 217A connected to, for example, the portable information device 18 shown in FIG. 1.

In use, the switches 218 to 221 incorporated in either of the strap bodies 211A and 211B are taken with fingers to bring the opposing resistive layers into contact with each other, thereby performing switching or sliding operation Also the operation for determining the portable information device 18 and the enable/disable switching operation of the input portion and switching portion of the strap bodies 211A and 211B can be performed by operating the key-top member 267 to switch the switch device in the first connecting member 215.

Since the USB connector 244 is provided as connector, the strap controller 200 can be used as means for operating the portable information device 18. Power can be supplied to the switches 218 to 221 of the strap controller 200, the IC chip 249, etc. from the portable information device 18 through the USB connector 244.

The strap controller 200 according to this embodiment has high-waterproof electrode since the electrode layers formed on the substrates 223*a* to 223*d* of the membrane 223 are covered with the packages 227 and 228.

This type of switching devices generally uses a silver electrode layer which is formed of burned silver paste as the material of the electrode layer. However, the silver electrode layer tends to cause what is called migration owing to corrosive phenomenon due to the presence of water, having the possibility of growing dendrite on the silver electrode layer to cause a short between the opposing layers. In view of this point, the entry of water into the electrode layers can be prevented by covering them with the packages 227 and 228. In other words, the entry of water due to rain or the presence of moisture into the electrode layers can be prevented in the pendant strap controller 200, thus having a great advantage of preventing migration.

In order to achieve sufficient water resistance, the position where the covering member 232 which joins the strap bodies 211A and 211B together must be a portion where the substrates 223*a* to 223*d* of the membrane 223 are packed with the packages 227 and 228. Since both of the strap bodies 211A and 211B are joined together in a bound condition with the covering member 232, water resistance can be increased. For example, even if water is adhered to the external packages 229 and 230 when used in rain or fog, the entry of water to the electrode layer of the membrane 223 can be prevented, so that corrosion or migration of the electrode layer can be prevented. Since the covering member 232 is disposed inside the first connecting member 215 via the double-wall structure of the first connecting member 215, the water resistance around the first connecting member 215 can be increased.

Furthermore, the portion where the USB connector 244 is introduced to the first connecting member 215 and the portion where the strip 246 is joined with the first connecting member 215 also have a double-wall structure, so that the water resistance can be increased at those portions. Since the wires of the pliable wiring substrate 231 are coated with resin, there is no possibility of corrosion of the wired portion. Thus, the wired portion is not covered with the package 227 or 228. However, also the pliable wiring substrate 231 may be covered with the package 227 or 228 or another package to increase the water resistance.

With the strap controller 200 having the above structure, when the strap bodies 211A and 211B are bent, the first substrate 223a and the second substrate 223b can slip off each other within the range that the distal end of the first substrate 223a having the notches 223g can move along the slit 223f and the third substrate 223c and the fourth substrate 223d can slip off each other within the range that the distal end of the fourth substrate 223d having the notches 223g can move along the slit 223f. Accordingly, the strap bodies 211A and 211B are provided with preferable pliability, having no possibility of changing the distance between the opposing substrates when the strap bodies 211A and 211B are bent. If the opposite ends of the opposing substrates were bound to each other, the substrates could not slip off as a result when the strap bodies 211A and 211B are bent. Therefore, a substrate located outside a bent portion would partially be turned up from a substrate inside the bent portion, having a high possibility of changing the distance between the substrates and so having the possibility that switching operation cannot be smoothly performed at the turned-up portion. The strap controller 200 is constructed such that the substrates can be slipped off each other in view of the above problem, as has been described, the switching operation can be smoothly performed when the strap bodies 211A and 211B are bent.

Furthermore, when a user wears the strap controller 200 around the neck, a terminal 273a of a terminal box 273 of the second connecting member 216 is present on the back of the neck. Therefore, when a connection terminal of an earphone or a headphone is inserted to the terminal 273a, the user can listen to audio information generated from the portable information device 18. Since the second connecting member 216 of the strap controller 200 with this structure is located closest to the ears of a user, the connection with an earphone or a headphone is easy, so that their connecting cord can be made short.

The functions of the portable information device 18, such as skip, back-skip, and menu selection, can be used by operating the switches 218 to 221. Since this device is of pendant type, a user can perform the back-skip operation with the switch 218 merely by tracing the contact of the switch 218 downward or grasping it in part, and perform backward sliding action for menu selection merely by tracing the switch 220 downward. In that case, since the strap is caught on the neck to be prevented from moving downward, allowing one-hand operation, thus providing preferable operability. Conversely, a user can perform a skip operation and an upward sliding action merely by tracing the switches 219 and 221 upward or partially grasping them while grasping part of the strap by one hand.

Since the second connecting member 216 incorporates the vibrating motor 346 shown in FIG. 11, vibration can easily be transmitted to a user, so that the user can easily perceive the vibration. The vibrating motor 346 may be constructed to vibrate every switch operation with the key-top member 267 to allow the user to have a firm grasp of the operating condition of the switch. Also, the vibrating motor 346 may be constructed to vibrate depending on the operation of the switches 218, 219, 220, and 221 or, alternatively, to vibrate in accordance with the operation of the portable information device 18.

Since the battery 351 is built in the second connecting member 216 as the power source of the vibrating motor 346, the vibrating motor 346 can be driven without loading the power source of the portable information device 18. The battery 351 may be used as auxiliary power for the portable information device 18.

(Second Embodiment)

Figure 12:
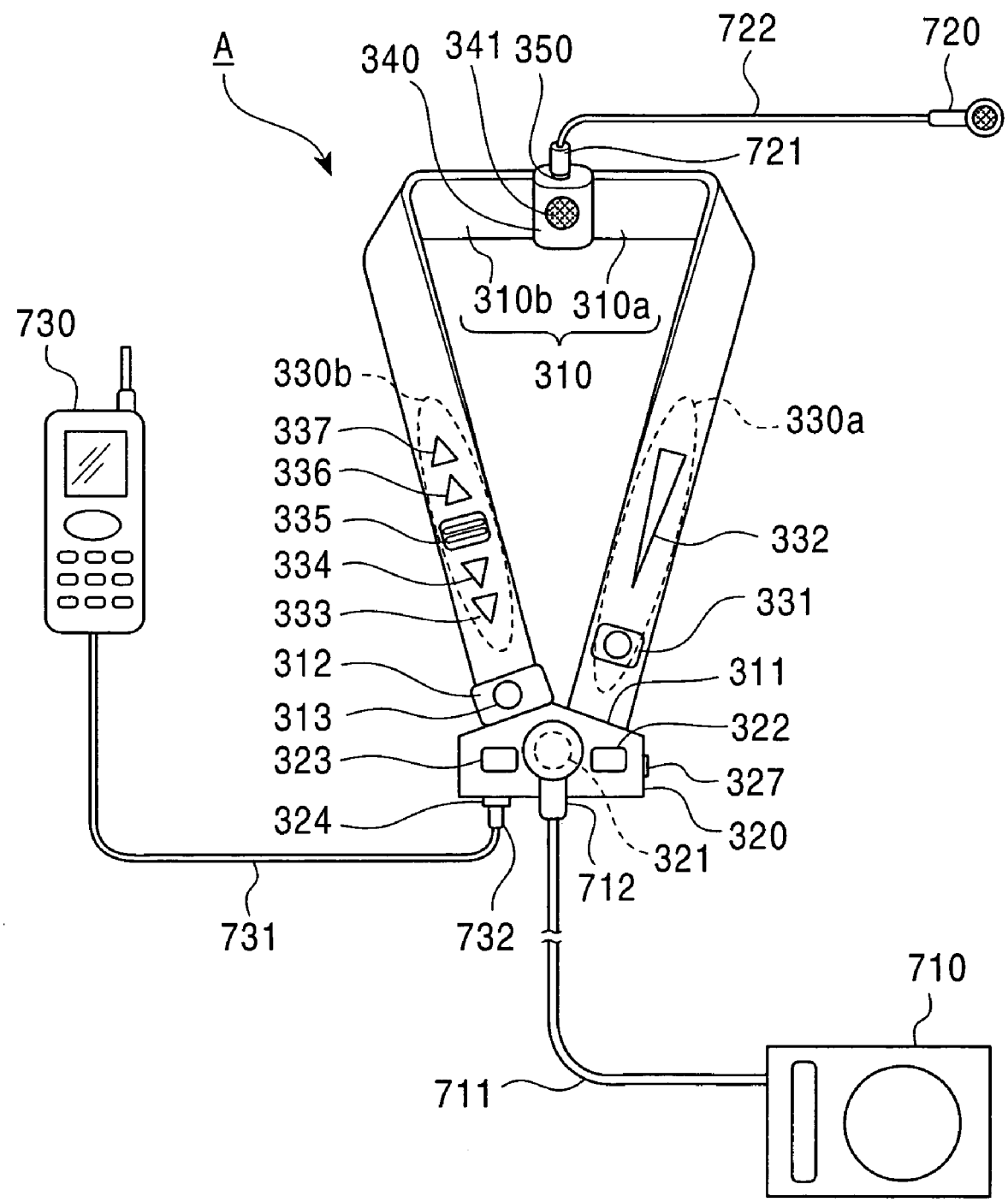
FIG. 12 is a front view of a pendant input/output device according to a second embodiment of the invention and external electronic devices connected thereto.
Figure 13A:
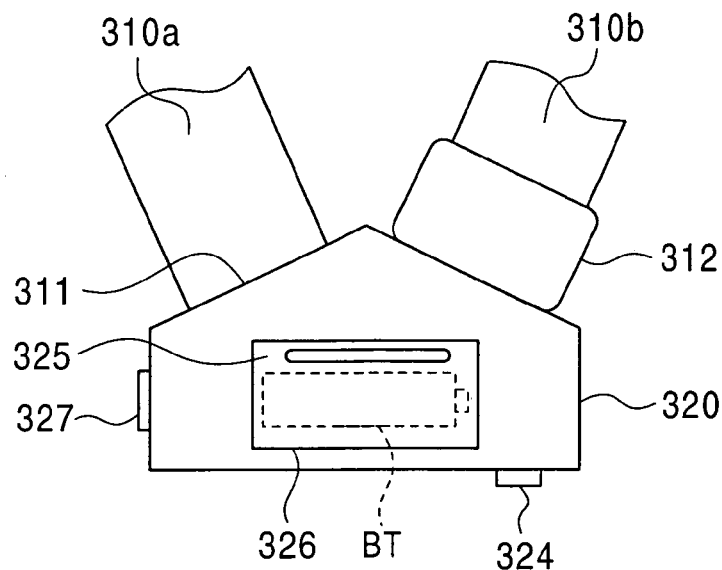
FIG. 13A is a plan view of the back of a connecting member according to the second embodiment.
Figure 13B:
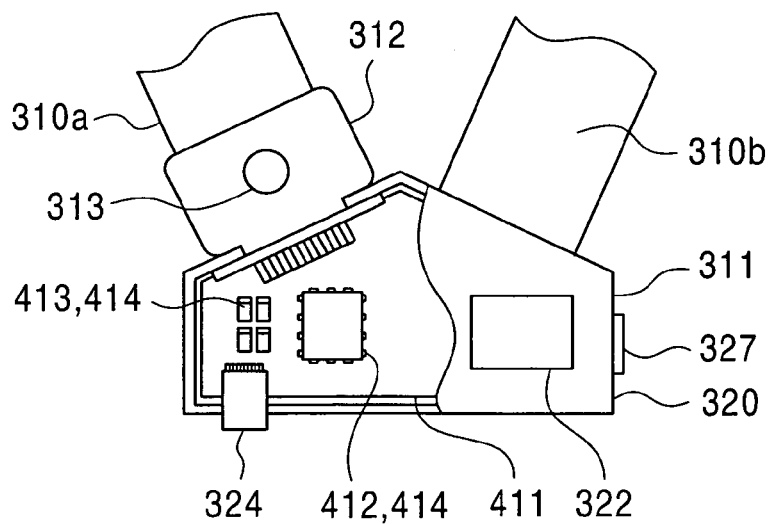
FIG. 13B is a plan view of the internal microstructure of the connecting member as viewed from the front.
Figure 13C:
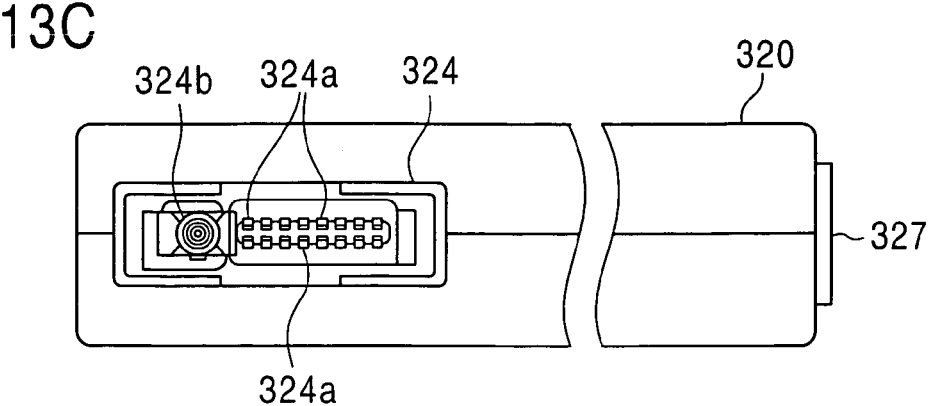
FIG. 13C is a bottom view of the connecting member.
Figure 14:
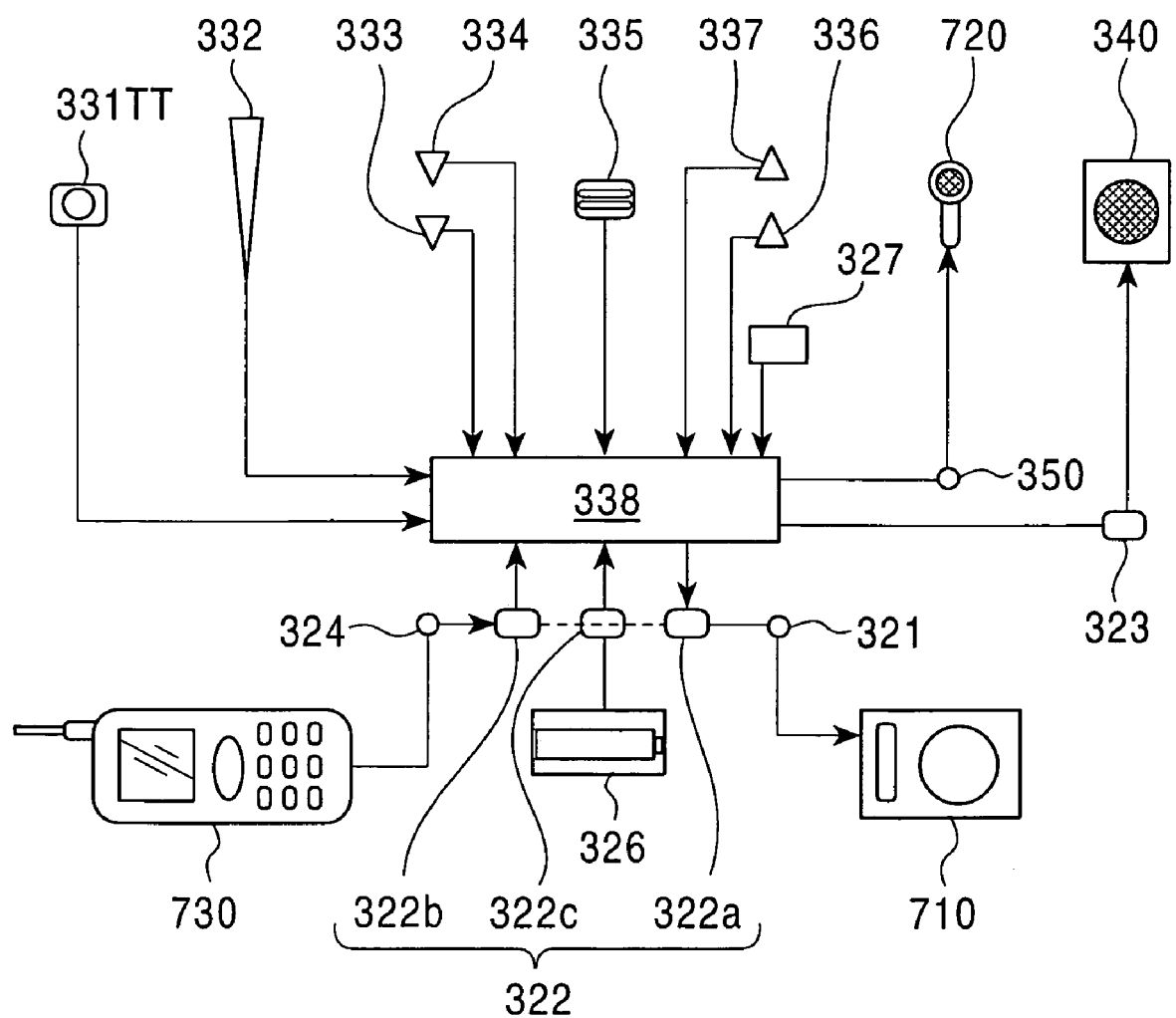
FIG. 14 is a connection diagram of an example of the electrical connection of the embodiment.
Figure 15:
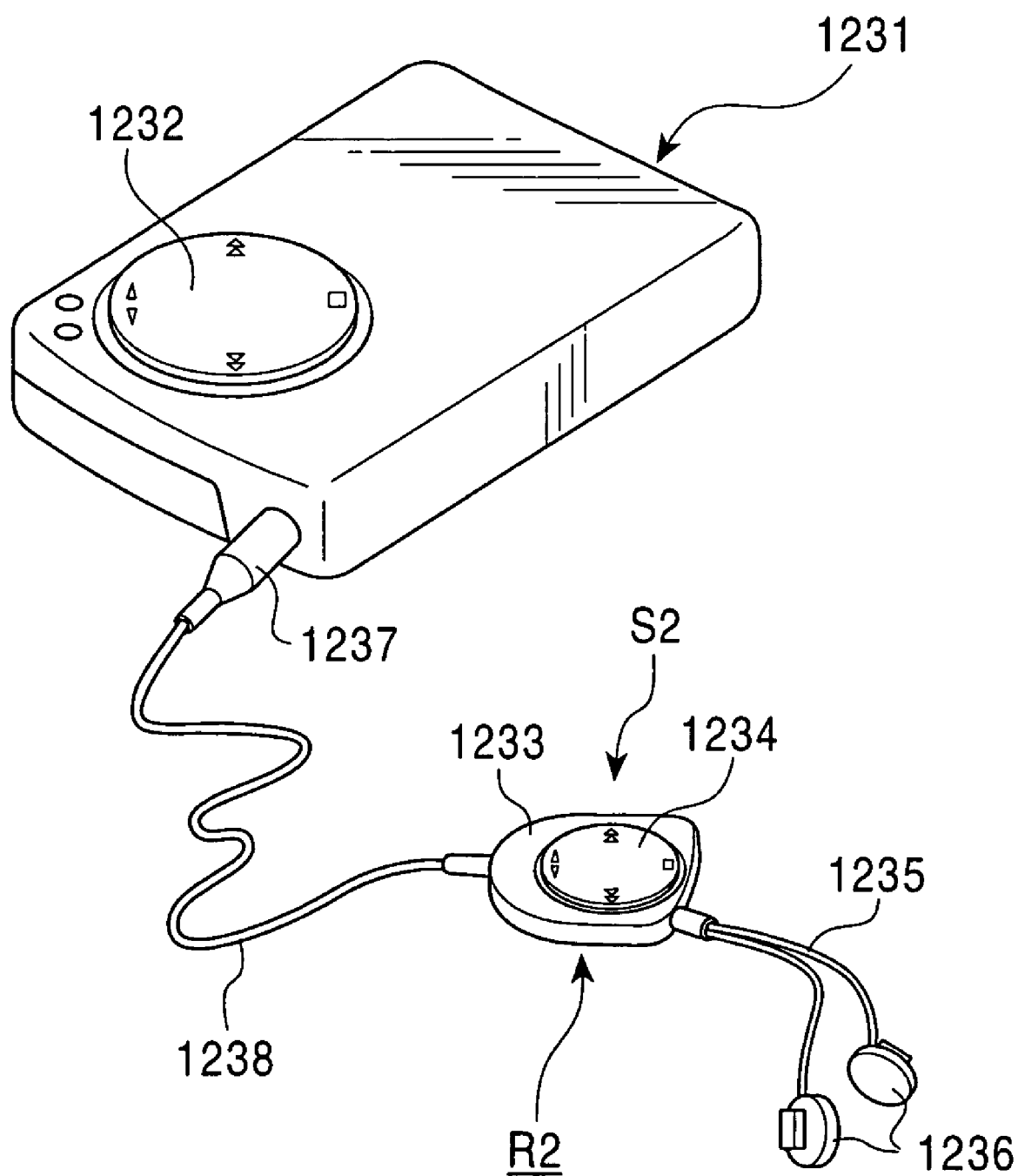
FIG. 15 is a perspective view of an example of a portable audio unit including a conventional remote controller.

FIG. 12 is a front view of a pendant input-output device according to a second embodiment of the invention, and a CD player 710, an earphone 720, and a cellular phone 730 which are examples of external electronic devices connected thereto. FIG. 13A is a plan view of the back of a connecting member 320. FIG. 13B is a plan view of the internal microstructure of the connecting member 320 as viewed from the front. FIG. 13C is a bottom view of the connecting member 320. FIG. 14 is a connection diagram of an example of the electric system of the device.

Referring to FIG. 12, an input-output device A of this embodiment includes flat-belt-like straps 310a and 310b, the connecting member 320 joining the straps 310a and 310b together in a ring shape, remote controllers 330a and 330b for the input/output of the CD player 710 and the cellular phone 730 which are external electronic devices, the vibrating member 340 driven by signals from the remote controllers 330a and 330b, and the earphone jack socket 350 which receives a jack 721 connected to the earphone 720 via a cord 722.

The straps 310a and 310b will be described with reference to FIG. 12. The straps 310a and 310b are substantially equal in length and connected together at first ends, with the vibrating member 340 interposed in the center thereof. A second end 311 of the strap 310a is fixed to the connecting member 320. A second end of the strap 310b is released, to which a hook 312 is attached. The hook 312 comes into engagement with a receptacle (not shown) of the connecting member 320 such that it can be opened or closed by operating an open/close button 313 provided on the hook 312. When a user wears a strap 310 around the neck and inserts the hook 312 into the receptacle of the connecting member 320 on the breast, the strap 310 is joined together in a ring shape around the neck. The connecting member 320 is located substantially in the center of the breast of the user in a state in which the user wears the strap 310 around the neck and the strap 310 is joined in a ring shape. Operation buttons etc. of the remote controllers 330a and 330b, which will be described later in detail, are disposed on the surface of the straps 310a and 310b, which extend in V-shape from the connecting member 320, adjacent to the connecting member 320. The vibrating plate 341 of the vibrating member 340 is disposed such that it is in contact with the back of the user's neck in a state in which the user wears the strap 310 around the neck. The earphone jack socket 350 which receives the jack 721 of the earphone 720 is disposed on the vibrating member 340.

The connecting member 320 will then be described. The connecting member 320 is a box-shaped product like a pendant head, and has a socket 321 connecting to a plug 712 extending from the CD player 710 via a cord 711, a main switch for turning on or off the entire remote control function, a vibration switch 323 for turning on or off of a vibration function, and a switch 325. The connecting member 320 also has a connector (socket) 324 at the lower end, which receives a jack 732 mounted to the end of a cord 731 which outputs an incoming signal from the cellular phone 730. As shown in FIG. 13A, the connecting member 320 also has a battery chamber 326 on the back, which is covered with a waterproof cover 325 such that it can freely be opened. The battery chamber 326 has a battery BT therein for driving the vibrating member 340.

As shown in FIG. 13B, the connecting member 320 has therein a circuit board 411, on which an IC chip 412, chip elements 413, etc. are contained to construct an input/output circuit 414. The circuit board 411 has the connecting member 324, from which a wire (not shown) extends and connects to the input/output circuit 414. The input/output circuit 414 connects to the wires in the straps 310a and 310b. With such a structure, operation signals from the remote controllers 330a and 330b are outputted to the cellular phone 730 or the CD player 710.

As shown in FIG. 13C, the connecting member 324 includes signal terminals 324a for sending various signals to the cellular phone 730 and a power terminal 324b for feeding power to the cellular phone 730. The signal terminals 324a are connected to the remote controllers 330a and 330b via the input/output circuit 414, and send operation signals from the remote controllers 330a and 330b to the cellular phone 730 or an incoming signal or sound from the cellular phone 730 to the vibrating member 340. The power terminal 324b is connected to the battery BT in the connecting member 320 via the input/output circuit 414, and supplies power from the battery BT to the cellular phone 730 when the remaining power in a built-in battery of the cellular phone 730 gets short.

The remote controllers 330a and 330b will now be described. The remote controllers 330a and 330b include groups of input terminals indicated collectively by numerals 330a and 330b, shown in FIG. 12, and a control circuit 338 (refer to FIG. 14) disposed in the strap 310 and the connecting member 320.

The remote controller 330a has a play button 331 and a sliding acoustic controller 332 as input terminals in order from the connecting member 320. The remote controller 330b has a search button 333, a skip button 334, a pause button 335, a repeat button, and a replay button 337 as input terminals in order from the connecting member 320. All the input terminals of the remote controllers 330a and 330b have characters or symbols (not shown) indicating their respective functions printed on their respective surfaces or adjacent positions.

The remote controllers 330a and 330b have the control circuit 338 wired in the strap 310 and the connecting member 320. As schematically shown in FIG. 14, the control circuit 338 is connected to a remote-control input port of the CD player 710 via a remote on/off switch 322a and the socket 321 at one end and connected to an incoming-signal output port of the cellular phone 730 via an incoming on/off switch 322b and the socket 324 at the other end. The remote on/off switch 322a and the incoming on/off switch 322b are drivingly connected to a power on/off switch 322c which is connected to the battery chamber 326 to construct a main switch 322. In other words, power to the control circuit 338 is supplied/stopped and the connections with the CD player 710 and the cellular phone 730 are turned on/off at the same time by the on/off of the main switch 322. The control circuit 338 is individually connected to the input terminals of the remote controllers 330a and 330b, namely, the play button 331, the sliding acoustic controller 332, the search button 333, the skip button 334, the pause button 335, the repeat button 336, and the replay button 337, and further connected to the earphone 720 via the earphone jack socket 350 and to the vibrating member 340 via the vibration switch 323.

The switch 325 selects one of the CD player 710 and the cellular phone 730 and connects the selected CD player 710 or cellular phone 730 to the remote controllers 330a and 330b. Briefly, the control circuit 338 selects one of the CD player 710 and the cellular phone 730 by operating the switch 325 and connects it to the remote controllers 330a and 330b.

As shown in FIG. 12, in the device according to this embodiment, the CD player 710, the earphone 720, and the cellular phone 730 are connected to prescribed sockets, with the strap 310 worn around the neck. When the main switch 322 is pushed, the input terminals of the remote controllers 330a and 330b are set to standby mode. When the vibration switch 323 is pushed, a vibration mode is set to standby mode. When a CD is loaded on the CD player 710 and the play button 331 on the strap 310a is pushed, the CD start playing from the first track to allow a user to listen to sound via the earphone 720. At that time, prior to the playback of the CD, a short-time vibration is transmitted from the vibrating member 340 to back of the user's neck as a signal for confirming that the play button 331 has been turned on. The volume can be controlled by operating the sliding acoustic controller 332 with fingers. Other operations on CD play, such as pause, skip, search, and replay, can be controlled remotely by pushing prescribed buttons on the strap 310b. Also in this case, operation confirmation signals are sent to the back of the user's neck by a short-time vibration from the vibrating member 340.

At an incoming call to the cellular phone 730, the incoming signal is transmitted through the cord 731 to the device and sent to the user as, for example, an intermittent vibration. Accordingly, the user can easily discriminate whether an operation confirmation signal for the CD player 710 or an incoming signal for the cellular phone 730 by varying the individual vibration patterns.

For example, when the CD player 710 is selected by operating the switch 325, the input terminals of the remote controllers 330a and 330b, namely, the play button 331, the sliding acoustic controller 332, and the various buttons 333, 334, 335, 336, and 337, are used only for operating the CD player 710 not for operating the cellular phone 730. Accordingly, when carrying both of the CD player 710 and the cellular phone 730, there is no need to carry multiple input/output devices and, after the CD player 710, the cellular phone 730, etc. are connected to one input/output device, one of which is then selected and operated, thus resulting in efficient operability.

(Third Embodiment)

Figure 16:
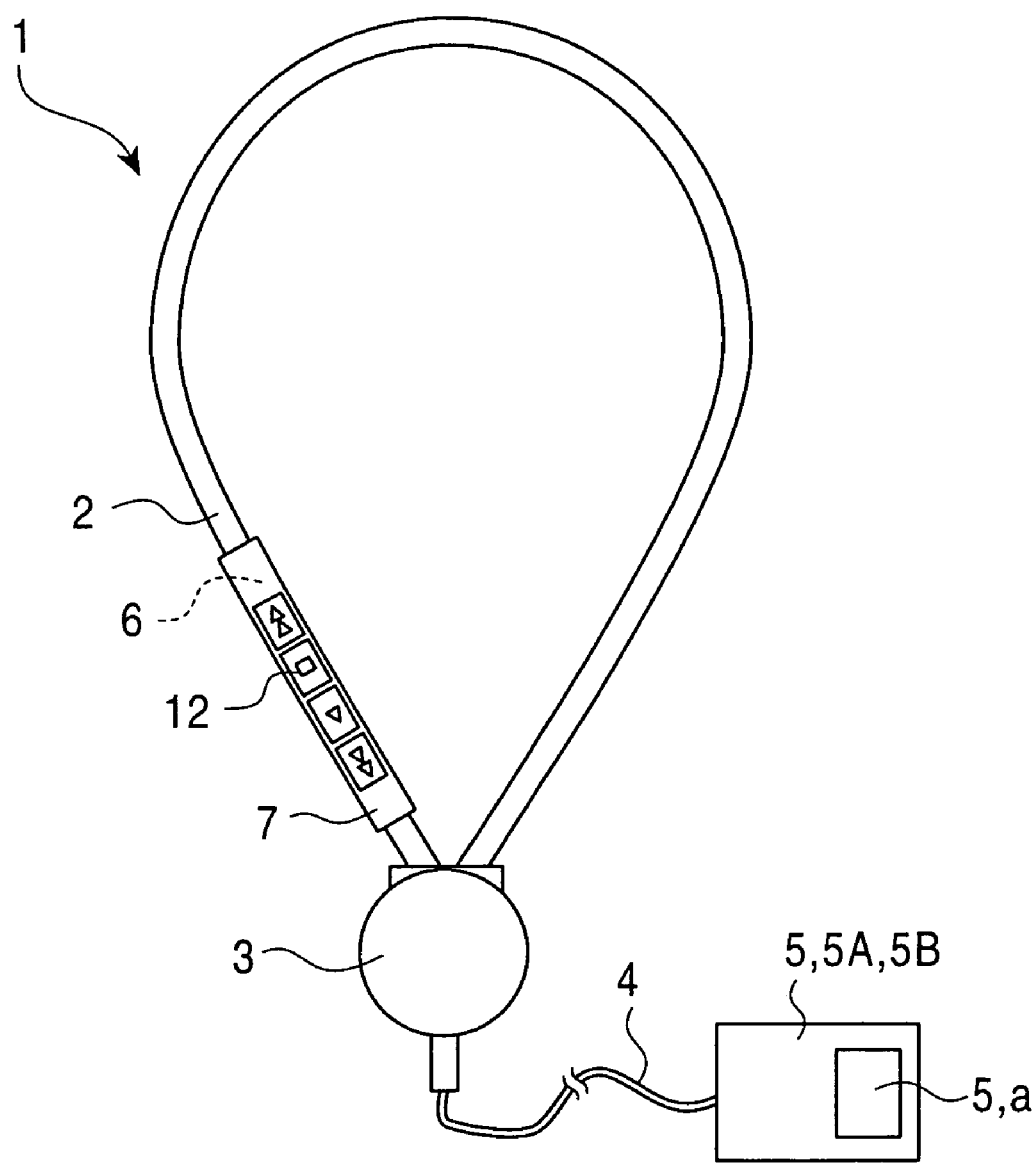
FIG. 16 is a schematic external view of one part of a remote controller according to an embodiment of the invention.
Figure 17:
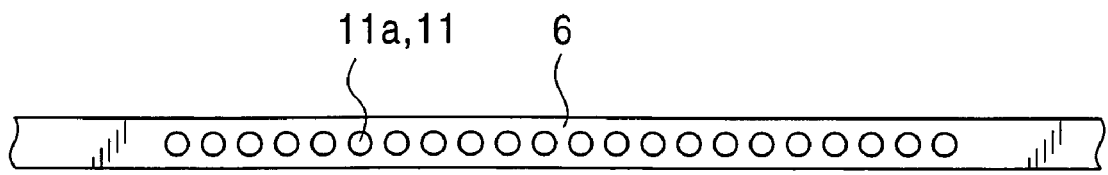
FIG. 17 is a schematic partial enlarged front view of part of the manual controller of FIG. 16.
Figure 18:
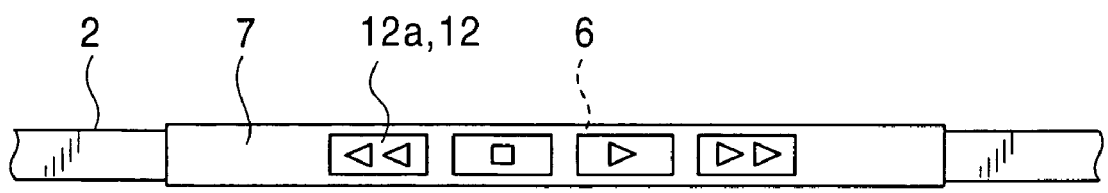
FIG. 18 is a schematic partial enlarged front view of the front of the controller of FIG. 16.
Figure 19:
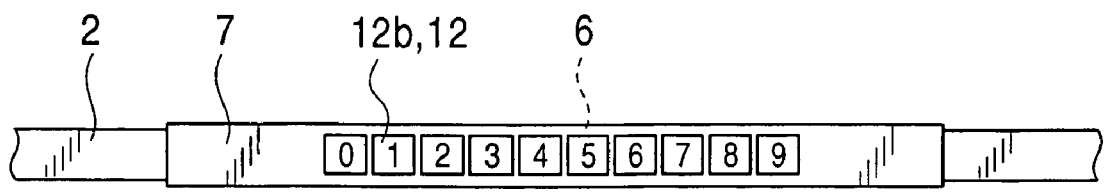
FIG. 19 is a schematic partial enlarged back view of the controller of FIG. 16.

FIGS. 16 to 19 show a remote controller according to a third embodiment of the invention, in which FIG. 16 is a schematic external view thereof; FIG. 17 is a schematic partial enlarged front view of one part of a manual operating member; FIG. 18 is a schematic partial enlarged front view of the controller; and FIG. 19 is a schematic partial enlarged back view of the operating member.

In this embodiment, a pendant portable electronic device for operating a portable audio device and a cellular phone is described as an example.

As shown in FIG. 16, a remote controller 1 according to this embodiment includes a strap body 2, a connecting member 3 joining the strap 2 together in a ring shape, and a connecting cord 4 serving as a connecting member. A portable electronic device 5 is connected to the end of the connecting cord 4. The portable electronic device 5 includes portable audio units 5A, such as a portable cassette tape player, a portable MD player, and a portable CD player, a cellular phone 5B, a portable information device, etc.

The strap body 2 includes an input operating portion 6 adjacent to the connecting member 3, at one end of the strap body 2 and on the left of FIG. 16. The input operating portion 6 has an operating member 7 on the surface. The input operating portion 6 may be provided on the other end of the strap body 2 or, alternatively, on opposite ends.

The strap body 2 is made of a belt-like pliable film formed of an insulating material such as polyethylene terephthalate (PET) or polyimide (PI).

The input operating portion 6 of this embodiment includes a large number of membrane switches 11 serving as input means. Membrane contacts 11a which are contacts of the membrane switches 11 are arranged at a specified pitch along the length of the strap body 2, as shown in the lateral direction of FIG. 17. Briefly, the input means has many contacts arranged along the length of the strap body 2. The membrane switches 11 may be disposed in multiple lines along the length of the strap body 2. FIG. 17 schematically shows part of the membrane contacts 11a of the many membrane switches 11.

The membrane switches 11 are constructed such that movable contacts are brought into contact with fixed contacts disposed on a fixed contact film through notches of a spacer by pushing a pushing surface of a movable contact film having the movable contacts. The membrane switches 11 are fixed such that opposite surfaces are sandwiched by belt-like films that construct the strap body 2, so that the membrane switches 11 serving as input means are incorporated in the strap body 2. The membrane switches 11 are electrically connected to the connecting cord 4 via the connecting member 3 with a conductor circuit (not shown), thereby being capable of transmitting information of the operation of the membrane contacts 11a to the portable electronic device 5.

The input means preferably has many contacts and pliability as a whole.

The operating member 7 operates the membrane switches 11 serving as input means indirectly, and are made of a pliable material, such as cloth, resin, and leather. The operating member 7 is mounted so as to coat part of the strap body 2, at least the input operating portion 6 in this embodiment. The operating member 7 is retained to the strap body 2 by holding the strap body 2 therebetween. The operating member 7 is shorter than the length of the strap body 2 and can be moved at least along the length of the strap body 2 as desired. The operating member 7 has marks 12 such as symbols on the outer surface. The operating member 7 can be rotated around the strap body 2.

The marks 12 are arranged so as to correspond to multiple input modes. The marks 12 of this embodiment are arranged so as to correspond to two kinds of input modes, an audio mode and a telephone mode, in such a manner that marks 12 used for audio-mode input operation are provided on one surface of the operating member 7 and marks 12 used for telephone-mode input operation are provided on the other surface or the back. The setting for the input modes will be described later.

The audio mode is one for remote control operation for the portable audio unit 5A which is one of the portable electronic devices 5. As shown in FIG. 18, the marks 12 used for audio-mode input operation include multiple first marks 12a indicating various input operations and their operating positions, such as stop, playback, forward, and reverse. The first marks 12a are arranged at a specified pitch on the front surface of the operating member 7.

The telephone mode is one for remote control operation for the cellular phone 5B which is another one of the portable electronic device 5. As shown in FIG. 19, the marks 12 used for telephone-mode input operation include multiple second marks 12b indicating various input operations and their operating positions, such as numerals 0 to 9. The second marks 12b are arranged at a specified pitch on the back of the operating member 7.

The pitch of the first marks 12a and the pitch of the second marks 12b are different from each other.

The operating member 7 is preferably detachable from the strap body 2 in consideration of easy cleaning and replacement of the operating member 7 when soiled. Examples of the structure of detaching the operating member 7 from the strap body 2 include a structure in which the operating member 7 is shaped in a flat plate, the end of which perpendicular to the length of the strap body 2 is closed or opened with a zip fastener, and a structure in which the operating member 7 is shaped in a cylinder made of an elastic material which is stretchable in the radial direction, so that the operating member 7 can be detached from the strap body 2 by detaching the strap body 2 from the connecting member 3.

The input mode can be of three kinds or more, in which case multiple operating members 7 can used.

Operating information, which is an operating signal sent from the membrane switches 11 serving as input means for the remote controller 1 of this embodiment, is sent to a controller 5a of the portable electronic device 5 connected via the connecting cord 4. The portable electronic device 5 is controlled on the basis of the operating information. The controller 5a of the portable electronic device 5 includes a CPU and a memory of an appropriate capacity, such as an ROM or RAM. The memory stores programs for controlling the operation of the portable electronic device 5, programs for setting the input mode and the operating position of the input means of the remote controller 1, various data used for executing the programs, etc.

Examples of the programs for setting the input mode and the operating position of the input means of the remote controller 1 include a program in which the input mode of the input means of the remote controller 1, the pattern of the contacts used in the input mode (of the many membrane contacts 11a, the number and pitch of contacts being used), and operation controlled by the contacts being used are set in advance as the initial mode of the remote controller 1.

For example, in order to use the input means of the remote controller 1 as audio mode, the program is set in advance such that the initial input mode of the input means is set in an audio mode and, of the many membrane contacts 11a, the pattern of all contacts used in the audio mode and, the number, pitch, and operation controlled by the contacts in this embodiment correspond to the first marks 12a provided on the outer surface of the operating member 7. In setting the remote controller 1, all contacts used in the audio mode and their positions are automatically set by pushing a contact serving as a starting point.

When the other contacts except the starting contact and the contacts used in the audio mode are pushed, in order to use the input means of the remote controller 1 as a telephone mode, the program is set in advance such that the input means is set in the telephone mode and, of the many membrane contacts 12a, the pattern of all contacts used in the telephone mode and, the number, pitch, and operation controlled by the contacts in this embodiment correspond to the second marks 12b provided on the outer surface of the operating member 7. All contacts used in the telephone mode and their positions are automatically set.

Accordingly, in this embodiment, part of the many membrane switches 11 are used as input means depending on the kind of the portable electronic device 5.

It is preferable to make the patterns (number, pitch, etc.) of the contacts used in the input modes and operation patterns controlled by the contacts correspond to the marks 12 provided on the outer surface of the operating member 7 in consideration of easy operation in setting the remote controller 1.

The membrane switches 11 serving as input means may be provided on both sides of the strap body 2. For example, the input means used in input operation in the audio mode shown in FIG. 18 may be provided on the front surface of the strap body 2; the input means used in input operation in the telephone mode shown in FIG. 19 may be provided on the back of the strap body 2. Adopting such a structure facilitates switching of the input modes.

The other structures are the same as those of the conventional one. Thus their description will be omitted here.

The operation of the embodiment with the foregoing structure will now be described.

As shown in FIG. 17, the remote controller 1 of this embodiment is used by connecting the connecting cord 4 to the portable electronic device 5.

The setting operation when the remote controller 1 of this embodiment is used for the portable audio unit 5A will be described.

The setting operation for the remote controller 1 of this embodiment is performed by using a program installed to the controller 5a of the portable audio unit 5A and the first marks 12a provided on the front surface of the operating member 7.

An operator first connects the connecting cord 4 of the remote controller 1 of this embodiment to the portable audio unit 5A which is the portable electronic device 5.

The operator moves the operating member 7 along the length of the strap body 2 to dispose the multiple first marks 12a provided on the front surface of the operating member 7, shown in FIG. 18, to desired operating positions on the visible front side.

The operator then pushes a specified mark of the first marks 12a of the operating member 7, for example, a stop mark. The membrane contact 11a disposed on the back of the stop mark operates by pushing the stop mark, so that operating information which is an operating signal is sent to the controller 5a of the portable audio unit 5A.

The controller 5a of the portable audio unit 5A which has received the operating signal sets the input mode of the input means to an audio mode, which is a preset initial mode, and automatically sets the number and pattern of contacts used in the audio mode and the operation of the portable audio unit 5A by pushing the contacts so as to correspond to the first marks 12a provided on the operating member 7. In that case, the position of the membrane contacts 11a used in the operation in the audio mode can be varied without changing the pattern by setting the position of the operating member 7 relative to the strap body 2. As a result, the input means to be used in the audio mode can easily be moved. In other words, the number and pattern of the membrane contacts 11a used for operation in the audio mode can be displaced along the length of the strap body 2 by moving the operating member 7 relative to the strap body 2.

The contacts used in the audio mode can be set manually by pushing the multiple first marks 12a, however, which requires labor for setting. Also input mode can be set by pushing the first marks 12a. Specifically, since the pitch of the first marks 12a is different from the pitch of the second marks 12b, it is possible to determine and set input mode depending on the difference in number and/or pitch of contacts being used.

The setting operation when the remote controller 1 according to this embodiment is used in the cellular phone 5B will be described.

The setting operation for the remote controller 1 according to the embodiment is performed by using a program installed in the controller 5a of the cellular phone 5B and the second marks 12b provided on the back of the operating member 7.

The operator first locates the second marks 12b formed on the back of the operating member 7, shown in FIG. 19, onto the front in the viewing direction by detaching or rotating the operating member 7 a half-turn in the direction perpendicular to the length of the strap body 2.

The operator then connects the connecting cord 4 of the remote controller 1 of this embodiment to the cellular phone 5B which is the portable electronic device 5.

Either of the reversing operation of the operating member 7 and the connecting operation of the connecting cord 4 by the operator may be made at first.

The operator then moves the operating member 7 along the length of the strap body 2 to dispose the second marks 12b formed on the back of the operating member 7, shown in FIG. 19, to a desired operating position on the visible front side.

The operator then pushes a specified mark of the second marks 12b of the operating member 7, for example, numeral mark 0. By pushing the mark 0, the membrane contact 11a disposed on the back of the mark 0 operates, so that an operating signal (operating information) is transmitted to the controller 5a of the cellular phone 5B. In that case, the controller 5a of the cellular phone 5B sets the input mode of the input means as audio mode which is a preset initial mode.

The operator then pushes another mark, for example, mark 1 adjacent to the mark 0. By pushing the mark 1, the membrane contact 11a disposed on the back of the mark 1 operates, so that an operating signal is transmitted to the controller 5a of the portable audio unit 5A. Since the pitch of the first marks 12a and the pitch of the second marks 12b are different, the membrane contact 11a at a position that is not used in the audio mode operates by pushing the mark 1. In accordance with the operating signal from the contact, the controller 5a of the cellular phone 5B determines the input mode as a telephone mode and sets the input means to a telephone mode. Specifically, of the many membrane contacts 11a, the controller 5a automatically sets the number and pattern of contacts used in the telephone mode and the operation of the cellular phone 5B by pushing the contacts so as to correspond to the second marks 12b formed on the operating member 7. In that case, the position of the membrane contacts 11a used in the operation in the telephone mode can be varied without changing the pattern by setting the position of the operating member 7 relative to the strap body 2. As a result, the input means to be used in the telephone mode can easily be moved. In other words, the number and pattern of the membrane contacts 11a used for operation in the telephone mode can easily be displaced along the length of the strap body 2.

The contacts to be used in the telephone mode can be manually set by pushing the second marks 12b.

The membrane switches 11 of the remote controller 1 according to the embodiment serve as the input means in the audio mode and the input means in the telephone mode. Briefly, the remote controller 1 of this embodiment includes multiple input means, thus having general-purpose versatility for multiple kinds of portable electronic devices 5.

According to the remote controller 1 of this embodiment, the membrane switches 11 serving as input means has multiple modes, two kinds of input modes—an audio mode and a telephone mode in this embodiment. Accordingly, the two kinds of input modes can be allocated to the portable audio unit 5A and the cellular phone 5B which are portable electronic devices 5.

Accordingly, the remote controller 1 of this embodiment can easily offer general-purpose versatility.

According to the remote controller 1 of this embodiment, the position of the membrane contacts 11a used for the operation in each input mode can be varied without changing the pattern by setting the position of the operating member 7 relative to the strap body 2. As a result, the position of the input means used for input operation can easily be moved, so that the position of the input operation can easily be changed to the preference of the operator.

According to the remote controller 1 of this embodiment, the input means includes multiple membrane contacts 11a arranged along the length of the strap body 2. Therefore, multiple input modes can be provided easily and reliably by setting the position and/or number of contacts to be used depending on the kind of the portable electronic device 5 and also the position of the input means, or the position of the input operation can easily be set to the preference of the operator by setting the position of contacts to be used.

The use of the operating member 7 of the remote controller 1 according to the embodiment prevents the input means from becoming soiled and facilitates cleaning or replacement by detaching the operating member 7 from the strap body 2.

Providing the marks 12 of the operating member 7 of the remote controller 1 according to the embodiment facilitates input operation to the input means.

It is to be understood that the present invention is not limited to the foregoing embodiments but various modifications may be made as necessary. For example, the device may be of hand-held type.

What is claimed is:

1. An input/output device comprising:
a pendant strap; and
a connecting member connecting the strap in a ring shape, wherein
the strap incorporates at least one input portion; and
the connecting member comprises a connector for the input portion and a cellular phone or a portable information device; the strap further includes first and second case-type connecting members at one end and another end and a wiring member connected to the connector therein; the first case-type connecting member comprises an input/output circuit connecting the input portion and the connector together therein; the second case-type connecting member comprises a terminal connected to the wiring member and capable of input and output for the cellular phone or the portable information device; wherein indirect operation can be performed by an operating member that covers a pad of the strap body,
wherein the at least one input portion includes at least one elongated sheet substrate mounted in the strap body, the at least one sheet substrate comprising electrode layers connected to the input/output circuit and resistive layers provided on the electrode layers and being separated from each other by a predetermined distance.

2. The input/output device according to claim 1, wherein:
the strap incorporates a power source; and
the connector includes a power terminal, wherein the power source and the cellular phone are connected together with the power terminal.

3. The input/output device according to claim 1, wherein the connector is a USB connector.

4. The input/output device according to claim 1, wherein the strap or the connecting member incorporates a vibrating member vibrating in accordance with an incoming signal of the cellular phone or a signal of the portable information device.

5. The input/output device according to claim 1, wherein the connecting member comprises a control circuit therein, wherein when a plurality of the cellular phones or the portable information devices is connected, the control circuit selects one of the connected cellular phones and portable information devices and connects the selected cellular phone or portable information device to the input portion.

6. A remote controller comprising:
a strap body incorporating input means and having pliability; and
a connecting member for connecting the strap body and portable electronic equipment,
wherein the input means has a plurality of input modes,
wherein the input means has a first and second elongated flexible substrates mounted in the strap body, the flexible substrates having electrode layers connected to a circuit portion and resistive layers provided on the electrode layers and being separated from each other by a predetermined distance,
wherein the resistive layers that face each other are operative to come into contact with each other when a sliding operation or a pushing operation is performed on an outer surface of the strap body,
wherein one of the input modes is set in response to a detection of the sliding operation or the pushing operation,
wherein the input means is capable of being indirectly operated by an operating member that covers a part of the strap body, and
wherein the operating member includes a slide input portion that is movable at least along a length of the strap body and a press input portion having a plurality of contacts arranged along the length of the strap body.

7. The remote controller according to claim 6, wherein the input means is disposed so as to be movable at least along a length of the strap body.

8. The remote controller according to claim 6, wherein the input means includes a plurality of contacts arranged along a length of the strap body.

9. The remote controller according to claim 6, wherein the input means can be operated indirectly by an operating member covering part of the strap body; and
the operating member is disposed to be movable at least along a length of the strap body and has operation marks on a surface of the operating member.

10. The remote controller according to claim 6, wherein the input means is provided on a front and back of the strap body.

* * * * *

UNITED STATES PATENT AND TRADEMARK OFFICE
CERTIFICATE OF CORRECTION

| | | |
|---|---|---|
| PATENT NO. | : 7,236,751 B2 | |
| APPLICATION NO. | : 10/918900 | |
| DATED | : June 26, 2007 | |
| INVENTOR(S) | : Shuzo Ono | |

It is certified that error appears in the above-identified patent and that said Letters Patent is hereby corrected as shown below:

On the Title Page

Column 19, in claim 1, line 18, after "that covers a" delete "pad" and substitute --part-- in its place.

Signed and Sealed this

Fourth Day of December, 2007

JON W. DUDAS
*Director of the United States Patent and Trademark Office*